United States Patent
Ueno et al.

(10) Patent No.: US 11,485,388 B2
(45) Date of Patent: Nov. 1, 2022

(54) VEHICLE CONTROL DEVICE

(71) Applicant: TOYOTA JIDOSHA KABUSHIKI KAISHA, Toyota (JP)

(72) Inventors: Koki Ueno, Toyota (JP); Yusuke Nakade, Nagoya (JP); Kazuhiro Ozawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 218 days.

(21) Appl. No.: 16/822,258

(22) Filed: Mar. 18, 2020

(65) Prior Publication Data

US 2020/0324791 A1 Oct. 15, 2020

(30) Foreign Application Priority Data

Apr. 10, 2019 (JP) .............................. JP2019-075143

(51) Int. Cl.
*B60W 60/00* (2020.01)
*G05D 1/00* (2006.01)

(52) U.S. Cl.
CPC ....... *B60W 60/0051* (2020.02); *G05D 1/0088* (2013.01)

(58) Field of Classification Search
None
See application file for complete search history.

(56) References Cited

U.S. PATENT DOCUMENTS

| | | | |
|---|---|---|---|
| 5,873,281 A | 2/1999 | Stasik et al. | |
| 2003/0076221 A1* | 4/2003 | Akiyama | H04L 12/40182 340/12.32 |
| 2015/0233472 A1* | 8/2015 | Kinoshita | B60W 50/0205 701/53 |
| 2020/0207416 A1* | 7/2020 | Tsunekazu | B62D 15/0275 |

FOREIGN PATENT DOCUMENTS

| | | |
|---|---|---|
| JP | 10-89458 A | 4/1998 |
| JP | 2001-304396 A | 10/2001 |
| JP | 2016-200986 A | 12/2016 |
| JP | 2018-176800 A | 11/2018 |
| JP | 2019-11783 A | 1/2019 |
| WO | WO 2018/193449 A1 | 10/2018 |
| WO | WO 2018/216054 A1 | 11/2018 |

* cited by examiner

*Primary Examiner* — Tamara L Weber
(74) *Attorney, Agent, or Firm* — Oblon, McClelland, Maier & Neustadt, L.L.P.

(57) ABSTRACT

A vehicle control device is applied to a vehicle including at least a shift control system configured to switch a shift range. The vehicle control device is configured to control the vehicle to perform autonomous driving travel without depending on an operation of a driver in at least one driving operation. The vehicle control device includes a controller. The controller is configured to determine the propriety of travel by the autonomous driving travel according to a type of abnormality that occurs in the shift control system. The controller is configured to perform travel control of the vehicle according to the propriety of the travel by the autonomous driving travel.

7 Claims, 7 Drawing Sheets

VEHICLE CONTROL DEVICE

INCORPORATION BY REFERENCE

The disclosure of Japanese Patent Application No. 2019-075143 filed on Apr. 10, 2019 including the specification, drawings and abstract is incorporated herein by reference in its entirety.

BACKGROUND

1. Technical Field

The present disclosure relates to a vehicle control device, and relates to control of a vehicle capable of executing autonomous driving travel.

2. Description of Related Art

There is known a vehicle that is capable of executing autonomous driving travel in which at least some of the travel of the vehicle is performed without depending on the operation of a driver. The vehicle is disclosed in Japanese Patent Application Publication No. 2016-200986 (JP 2016-200986 A). According to JP 2016-200986 A, when an abnormality of a vehicle occurs during autonomous driving travel, the vehicle stops after moving to a prescribed turnout place, and then the autonomous driving travel is ended.

SUMMARY

In the case where an abnormality occurs in the vehicle disclosed in JP 2016-200986 A during autonomous driving travel, and the abnormality relates to a shift control system, moving the vehicle to a prescribed turnout place may possibly deteriorate the convenience of autonomous driving travel.

The present disclosure provides a control device for a vehicle capable of executing autonomous driving travel, the control device enhancing the convenience of the autonomous driving travel when an abnormality occurs in a shift control system.

A vehicle control device according to one aspect of the present disclosure is applied to a vehicle including at least a shift control system configured to switch a shift range. The vehicle control device is configured to control the vehicle to perform autonomous driving travel without depending on an operation of a driver in at least one driving operation. The vehicle control device includes a controller. The controller is configured to determine propriety of travel by the autonomous driving travel according to a type of abnormality that occurs in the shift control system. The controller is configured to perform travel control of the vehicle according to the propriety of the travel by the autonomous driving travel. The vehicle control device according to one aspect of the present disclosure may be configured to control the vehicle to perform autonomous driving travel to a target location without depending on the operation of the driver in at least one driving operation. The controller may be configured to determine propriety of travel by the autonomous driving travel according to whether an abnormality that occurs in the shift control system is an abnormality that does not prevent the vehicle from reaching the target location.

The vehicle control device according to one aspect of the present disclosure enables the vehicle to travel to a target location by the autonomous driving travel, depending on the type of the abnormality that occurs in the shift control system. Accordingly, determining the propriety of autonomous driving travel according to whether the abnormality in the shift control is the abnormality that does not prevent the vehicle from reaching the target location makes it possible to restrain the autonomous driving travel from being cancelled more than necessary. This increases the scene where the autonomous driving travel is executed, and thereby the convenience of the autonomous driving travel is enhanced.

The vehicle control device according to one aspect of the present disclosure may be applied to a vehicle configured to enable switching between the autonomous driving travel and manual driving travel where the vehicle is controlled to travel by operation of a driver. When the abnormality in the shift control system is the abnormality that does not prevent the vehicle from reaching a target location, the controller may be configured to determine that the autonomous driving travel is possible, or to determine that switching from the manual driving travel to the autonomous driving travel is possible.

When the abnormality occurs in the shift control system, but the abnormality is the abnormality that does not prevent the vehicle from reaching a target location, the vehicle control device according to one aspect of the present disclosure determines that continuation of the autonomous driving travel is possible, or to determine that switching from the manual driving travel to the autonomous driving travel is possible. This increases the scene where the autonomous driving travel is executed, and thereby the convenience of the autonomous driving travel is enhanced.

In the vehicle control device according to one aspect of the present disclosure, when an abnormality that is failure in switching to a parking range occurs during the autonomous driving travel, the controller may be configured to determine that the autonomous driving travel of the vehicle to a target location is possible.

Even when switching to the parking range fails during autonomous driving travel, the vehicle control device according to one aspect of the present disclosure enables the vehicle to reach a preset target location by the autonomous driving travel. Therefore, even when the abnormality that is failure in switching to the parking range occurs during autonomous driving travel, it is determined that the vehicle can perform autonomous driving travel to the target location. Accordingly, since the autonomous driving travel continues, the convenience of the autonomous driving travel is enhanced.

In the vehicle control device according to one aspect of the present disclosure, the controller may be configured to predict whether forward-backward switching is performed in subsequent travel. When an abnormality that is failure in the forward-backward switching occurs during the autonomous driving travel, and the controller predicts that the forward-backward switching is not performed in subsequent travel, the controller may be configured to determine that the autonomous driving travel of the vehicle to the target location is possible.

In the vehicle control device according to one aspect of the present disclosure, even in the case where the abnormality that is failure in forward-backward switching occurs during the autonomous driving travel, the vehicle can reach the target location by the autonomous driving travel when it is predicted that the forward-backward switching is not performed in subsequent travel. Therefore, even in the case where the abnormality that is failure in forward-backward switching occurs during the autonomous driving travel, it is determined that the autonomous driving travel of the vehicle to the target location is possible when it is predicted that the forward-backward switching is not performed in subsequent travel. Accordingly, since the autonomous driving travel continues, the convenience of autonomous driving travel is enhanced.

In the vehicle control device according to one aspect of the present disclosure, the shift control system may be configured to switch the shift range through two or more communication paths. When an abnormality occurs in one of the communication paths, the controller may be configured to determine that the autonomous driving travel to the target location of the vehicle is possible.

In the vehicle control device according to one aspect of the present disclosure, when the abnormality occurs in one of the communication paths during autonomous driving travel in the configuration where the shift range can be switched through two or more communication paths, the vehicle can reach the target location by autonomous driving travel with use of the communication path that operates normally. Therefore, even when the abnormality occurs in one of the communication paths during autonomous driving travel, it is determined that autonomous driving travel of the vehicle to the target location is possible. Accordingly, since the autonomous driving travel continues, the convenience of the autonomous driving travel is enhanced.

In the vehicle control device according to one aspect of the present disclosure, when an abnormality that is failure in switching to a parking range occurs during the manual driving travel, and then the driver executes switching operation to the autonomous driving travel, the controller may be configured to determine that switching to the autonomous driving travel is possible.

Even when switching to the parking range fails, the vehicle control device according to one aspect of the present disclosure enables the vehicle to reach the target location by the autonomous driving travel. Therefore, when the switching operation to autonomous driving travel is executed even though the abnormality that is failure in switching to the parking range occurs during manual driving travel, it is determined that switching to the autonomous driving travel is possible. Since the manual driving travel is switched to the autonomous driving travel, the convenience of the autonomous driving travel is enhanced.

In the vehicle control device according to one aspect of the present disclosure, in the case where the abnormality that is failure in the forward-backward switching occurs during the manual driving travel, and then the driver executes the switching operation to the autonomous driving travel, the controller may be configured to determine that switching to the autonomous driving travel is possible when the controller predicts that the forward-backward switching is not performed in subsequent travel.

In the vehicle control device according to one aspect of the present disclosure, even in the case where an abnormality that is failure in forward-backward switching occurs, the vehicle can reach the target location by the autonomous driving when it is predicted that the forward-backward switching is not performed in subsequent travel. Therefore, when switching operation to the autonomous driving travel is executed even though the abnormality that is failure in forward-backward switching occurs during manual driving travel, it is determined that switching to the autonomous driving travel is possible when it is predicted that forward-backward switching is not performed in subsequent travel. Accordingly, since switching to the automated driving travel is performed, the convenience of the automated driving travel is enhanced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinbelow, embodiments of the present disclosure will be described in detail with reference to the accompanying drawings. In the following embodiments, the drawings are simplified or deformed as necessary, and therefore the details of each component, such as a proportion, and a form, may be different from those of real components.

Figure 1:
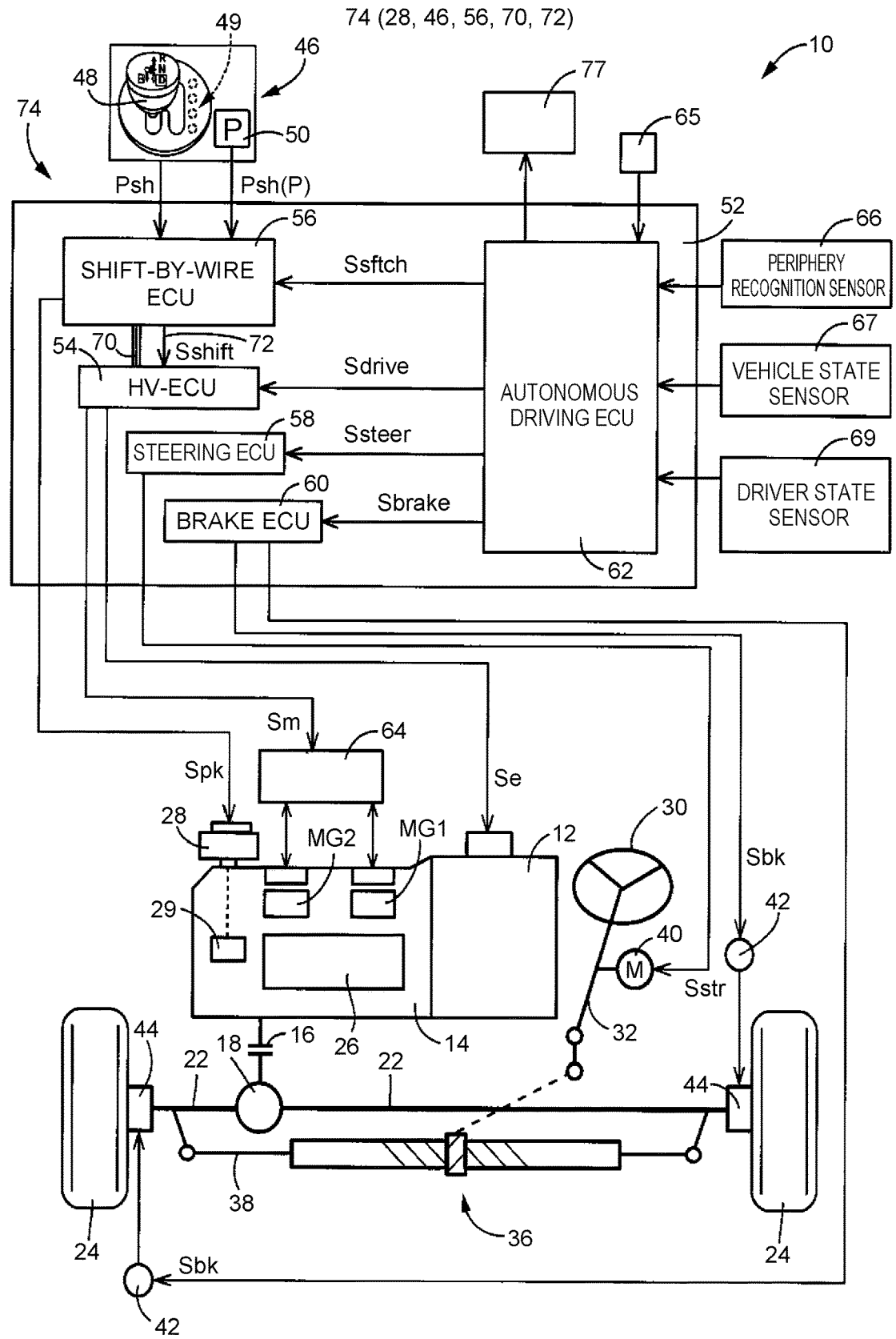
FIG. 1 shows schematic configuration of a hybrid vehicle to which the present disclosure is applied, while showing the principal part of a control system provided for controlling each unit of the vehicle.

FIG. 1 shows schematic configuration of a hybrid vehicle 10 to which the present disclosure is applied, while showing the principal part of a control system provided for controlling each unit of the vehicle 10. The vehicle 10 includes an engine 12 as a source of driving force for travel, a transmission unit 14, a differential gear unit 18 that receives motive power transmitted through an output gear 16 of the transmission unit 14, a pair of right and left axle 22, and a pair of right and left front wheels 24.

For example, the transmission unit 14 is a front engine-front wheel drive (FF) transaxle that is disposed crosswise in the vehicle 10. The transmission unit 14 includes a first electric motor MG1, a motive power distribution mechanism 26 that distributes the motive power transmitted from the engine 12 to the first electric motor MG1 and the output gear 16, and a second electric motor MG2 coupled with the output gear 16 so as to be able to transmit the motive power to the output gear 16. The transmission unit 14 includes a well-known parking lock mechanism 29 that is driven by an actuator 28 to mechanically stop rotation of the front wheels 24.

For example, the first electric motor MG1 and the second electric motor MG2 are synchronous motors including at least one of the function as a motor made to generate mechanical drive force from electrical energy and the function as an electric generator to generate electrical energy from the mechanical drive force. Preferably, the first electric motor MG1 and the second electric motor MG2 are motor-generators selectively operated as a motor or an electric generator. For example, the first electric motor MG1 includes a generator function to receive counterforce of the engine 12, and a motor function to rotationally drive the engine 12 that is in an operation stopped state. The second electric motor MG2 includes an electric motor function to function as an electric motor for travel that is made to output drive force as a source of driving force for travel, and an electric power generation function to generate electrical energy by regeneration using reverse driving force from the side of the front wheels 24.

In the vehicle 10, the motive power of the engine 12 is transmitted to the output gear 16 through the motive power distribution mechanism 26, and the motive power is transmitted to the right and left front wheels 24 through the differential gear unit 18 and the axle 22. The motive power of the second electric motor MG2 is transmitted to the output gear 16, and the motive power is transmitted to the right and left front wheels 24 through the differential gear unit 18 and the axle 22.

The steering wheel 30 is operated by a driver. When the driver rotates the steering wheel 30, the rotation is transmitted to a gearbox 36 via a steering shaft 32 that is coupled with the steering wheel 30. In the gearbox 36, the rotation of the steering shaft 32 is converted into rightward-leftward motion of a tie rod 38 that is coupled with the gearbox 36. As the tie rod 38 moves in a rightward-leftward direction, an angle of the right and left front wheels 24 changes. The steering shaft 32 is provided with an electric motor 40 such that motive power can be transmitted to the steering shaft 32. The electric motor 40 is made to function as an electrically-operated power steering system for assisting operation of the driver. The electric motor 40 assists operation of the driver. In addition, when autonomous driving travel is executed, the electric motor 40 can change the angle of the right and left front wheels 24 by automatically rotating the steering shaft 32.

The right and left front wheels 24 are each provided with a wheel brake 44 to which braking force is applied by regulating hydraulic pressure of a hydraulic fluid supplied to a brake hydraulic cylinder 42. The hydraulic pressure of the hydraulic fluid in the brake hydraulic cylinder 42 increases in proportion to foot force applied to a brake pedal by the driver. The braking force generated in the wheel brakes 44 increases in proportion to the hydraulic pressure of the hydraulic fluid. The hydraulic pressure of the hydraulic fluid in the brake hydraulic cylinder 42 is also controlled by a brake signal Sbk output from a later-described brake ECU 60. Accordingly, braking force can be applied to the front wheels 24 according to the travel state of the vehicle 10. During autonomous driving travel, the hydraulic pressure of the hydraulic fluid in the brake hydraulic cylinder 42 is controlled based on the brake signal Sbk output from the brake ECU 60. Appropriate braking force is applied from the wheel brake 44 according to the travel state of the vehicle 10. Rear wheels, which are not illustrated, are also equipped with the same wheel brakes 44 as the front wheels 24.

A shift operation device 46 is provided at a position where the driver can operate. The shift operation device 46 includes a momentary shift lever 48 that is operable to a plurality of shift operation positions Psh, and a P switch 50. The momentary shift lever 48 is a mechanism that allows the shift lever 48 to return to a preset home position once the driver releases the operation of the shift lever 48.

The shift lever 48 is configured such that a shift operation position Psh is operable to R position that is a backward travel (reverse) position, N position that is a neutral position, D position that is a forward travel (drive) position, and B position that is an engine brake position. When the driver shifts the shift lever 48 to the R position, the transmission unit 14 is switched to a backward travel range (R range) for backward travel of the vehicle 10. When the driver shifts the shift lever 48 to the N position, the transmission unit 14 is switched to a neutral range (N range) where a power transmission line in the transmission unit 14 is interrupted. When the driver shifts the shift lever 48 to the D position, the transmission unit 14 is switched to a forward travel range (D range) for forward travel of the vehicle 10. When the driver shifts the shift lever 48 to the B position, the transmission unit 14 is switched to an engine brake range made to generate engine brake.

The P switch 50 is a push button switch, for example. When the P switch 50 is pushed, and the vehicle 10 satisfies a prescribed condition, such as the vehicle 10 being in a stopped state or a vehicle speed V being very low, the parking lock mechanism 29 operates through the electrically-operated actuator 28. At the time, as the rotation of the output gear 16 mechanically stops, the front wheels 24 that are mechanically coupled with the output gear 16 also stop its rotation. Thus, the transmission unit 14 is switched to the parking range (P range) for parking of the vehicle 10.

The vehicle 10 adopts what is called a shift-by-wire system. In the shift-by-wire system, the shift lever 48 of the shift operation device 46 is electrically coupled with the transmission unit 14 through a wire (communication line), instead of being mechanically coupled with the transmission unit 14.

In the shift operation device 46, four Hall ICs 49 shown with a broken line are provided. The Hall ICs 49 function as sensors for detecting the shift operation position Psh. When the driver operates the shift lever 48, unillustrated magnets that are fixed to the shift lever 48 change their respective positions relative to the Hall ICs 49, and thereby voltage values output from the Hall ICs 49 change. Here, the voltage values obtained when the shift lever 48 is shifted to the respective shift operation positions Psh are calculated and stored in advance for each of the Hall ICs 49. Accordingly, when the voltage values of the respective Hall ICs 49 are detected, the shift operation position Psh of the shift lever 48 is determined. The voltage values for the shift operation positions Psh of the Hall ICs 49 are each set with a prescribed width in consideration of variation of components, or the like.

The vehicle 10 includes a plurality of ECUs which function as an electronic control device 52 (controller) configured to control each unit of the vehicle 10. The electronic control device 52 includes an HV-ECU 54, a shift-by-wire ECU 56, a steering ECU 58, a brake ECU 60, and an autonomous driving ECU 62. The HV-ECU 54 is for hybrid drive control relating to the engine 12, the first electric motor MG1, the second electric motor MG2, and the like. The shift-by-wire ECU 56 controls a travel range (shift range) of the transmission unit 14. The steering ECU 58 controls the electric motor 40 that constitutes the electrically-operated power steering system. The brake ECU 60 controls the brake hydraulic cylinder 42 that regulates the braking force of the wheel brakes 44. The autonomous driving ECU 62 executes later-described autonomous driving travel (autonomous driving control). The ECUs are each configured by including a so-called microcomputer including a CPU, a RAM, a ROM, and an input-output interface. The CPU executes a variety of control of the vehicle 10 by performing signal processing according to programs pre-stored in the ROM, while using a temporary storage function of the RAM.

The HV-ECU 54 has a function of outputting drive force requested by the driver, while controlling the engine 12, the first electric motor MG1, and the second electric motor MG2 according to the travel state of the vehicle so as to achieve optimal fuel efficiency. The HV-ECU 54 outputs signals, such as an engine output control command signal Se for output control of the engine 12, and a motor control command signal Sm output to the inverter 64 for drive control of the first electric motor MG1 and the second electric motor MG2.

The shift-by-wire ECU 56 has a function of detecting the shift operation position Psh, based on signals indicating the shift operation position Psh output from the Hall ICs 49 of the shift operation device 46, and switching the shift range of the transmission unit 14 based on the detected shift operation position Psh. For example, when the shift lever 48 is shifted to the D position, the shift-by-wire ECU 56 outputs a shift signal Sshift for switching the shift range, to the forward travel range for forwarding the vehicle 10, to the HV-ECU 54. Upon reception of the signal, the HV-ECU 54 outputs an engine output control command signal Se and a motor control command signal Sm for forward travel of the vehicle 10. For example, when the P switch 50 is pushed, the shift-by-wire ECU 56 outputs a parking lock command signal Spk for driving the actuator 28 to operate the parking lock mechanism 29 so as to switch the shift range of the vehicle 10 to the parking range.

Here, the HV-ECU 54 and the shift-by-wire ECU 56 are connected through two communication lines, including a CAN communication line 70 and a local line 72. Accordingly, the HV-ECU 54 and the shift-by-wire ECU 56 are configured such that when one of the communication line is disconnected, the command signal can still be transmitted through the other communication line. In short, the HV-ECU 54 and the shift-by-wire ECU 56 are configured such that the shift range can be switched through two communication paths (command paths). The CAN communication line 70 and the local line 72 correspond to two or more communication paths of the present disclosure.

The steering ECU 58 has a function of generating assist force corresponding to a steering angle θwheel corresponding to the operation amount of the steering wheel 30 operated by the driver and a vehicle speed V. When the driver operates the steering wheel 30, the steering ECU 58 outputs an assist command signal Sstr for generating the assist force corresponding to the operation amount of the steering wheel 30 to the electric motor 40.

The brake ECU 60 has a function of generating braking force corresponding to the travel state, by controlling the hydraulic pressure of the brake hydraulic cylinder 42. For example, when determining that urgent braking is performed based on a depression speed of the brake pedal or the like, the brake ECU 60 outputs a brake signal Sbk for increasing the hydraulic pressure of the brake hydraulic cylinder 42 to enhance the braking force.

When the travel mode is switched to autonomous driving travel, the autonomous driving ECU 62 controls the vehicle 10 to travel toward a preset target location, i.e., controls the vehicle 10 to perform autonomous driving travel that does not depend on operation of the driver, based on information such as the target location (target location information), and a current location (current location information). The autonomous driving ECU 62 has a function of autonomously parking at a target parking location (target parking frame) specified in advance, when the travel mode is switched to the autonomous driving travel at the time of parking the vehicle 10. The target location is a destination desired by the driver, the destination being preset by the driver. The target parking location is a parking frame that is specified by the driver at the time of parking the vehicle 10, or automatically specified based on the current location information or the like. The target parking location is one aspect of the target location.

The travel mode is switched to the autonomous driving travel and autonomous parking by turning on (switched to an autonomous driving travel side) an autonomous driving selector switch 65 provided in a driver's seat by the driver. When the autonomous driving selector switch 65 is turned off (switched to a manual driving travel side) during autonomous driving travel and autonomous parking, and when any of the steering wheel 30, the accelerator pedal, and the brake pedal is operated by the driver during autonomous driving travel and autonomous parking, the autonomous driving travel and autonomous parking are switched to manual driving travel. Thus, the vehicle 10 is configured to enable switching between the manual driving travel and the autonomous driving travel. The manual driving travel corresponds to general travel where the vehicle 10 is made to travel by operation of the driver.

The autonomous driving ECU 62 receives various pieces of information regarding surrounding of the vehicle 10, such as the presence of obstacles around the vehicle 10, and the presence of vehicles traveling on the front, rear, right, and left sides of the vehicle 10, from a periphery recognition sensor 66 (such as an infrared sensor, a camera, a middle and long range radar, and the like). The autonomous driving ECU 62 also receives various pieces of information indicating the vehicle state from a vehicle state sensor 67. The information includes an engine speed Ne of the engine 12, a throttle opening θth, the shift range of the transmission unit 14, a speed Nmg1 of the first electric motor MG1, a speed Nmg2 of the second electric motor MG2, the vehicle speed V, and the steering angle θwheel of the steering wheel 30. The autonomous driving ECU 62 also receives information regarding operation by the driver (driver operation), such as depression of the accelerator pedal, depression of the brake pedal, and operation of the steering wheel 30, from a driver state sensor 69. The periphery recognition sensor 66 is constituted of a plurality of sensors, such as an infrared sensor, a camera, and a middle and long range radar. The vehicle state sensor 67 and the driver state sensor 69 are also constituted of a plurality of sensors for detecting each of the parameters.

The autonomous driving ECU 62 outputs a drive force command signal Sdrive for regulating the drive force during autonomous driving travel to the HV-ECU 54, a shift switching command signal Ssftch for switching the shift range during autonomous driving travel to the shift-by-wire ECU 56, a steering command signal Ssteer for regulating the steering angle θwheel of the steering wheel 30 during autonomous driving travel to the steering ECU 58, and a braking force command signal Sbrake for regulating the braking force of the wheel brakes 44 during autonomous driving travel to the brake ECU 60.

Figure 2:
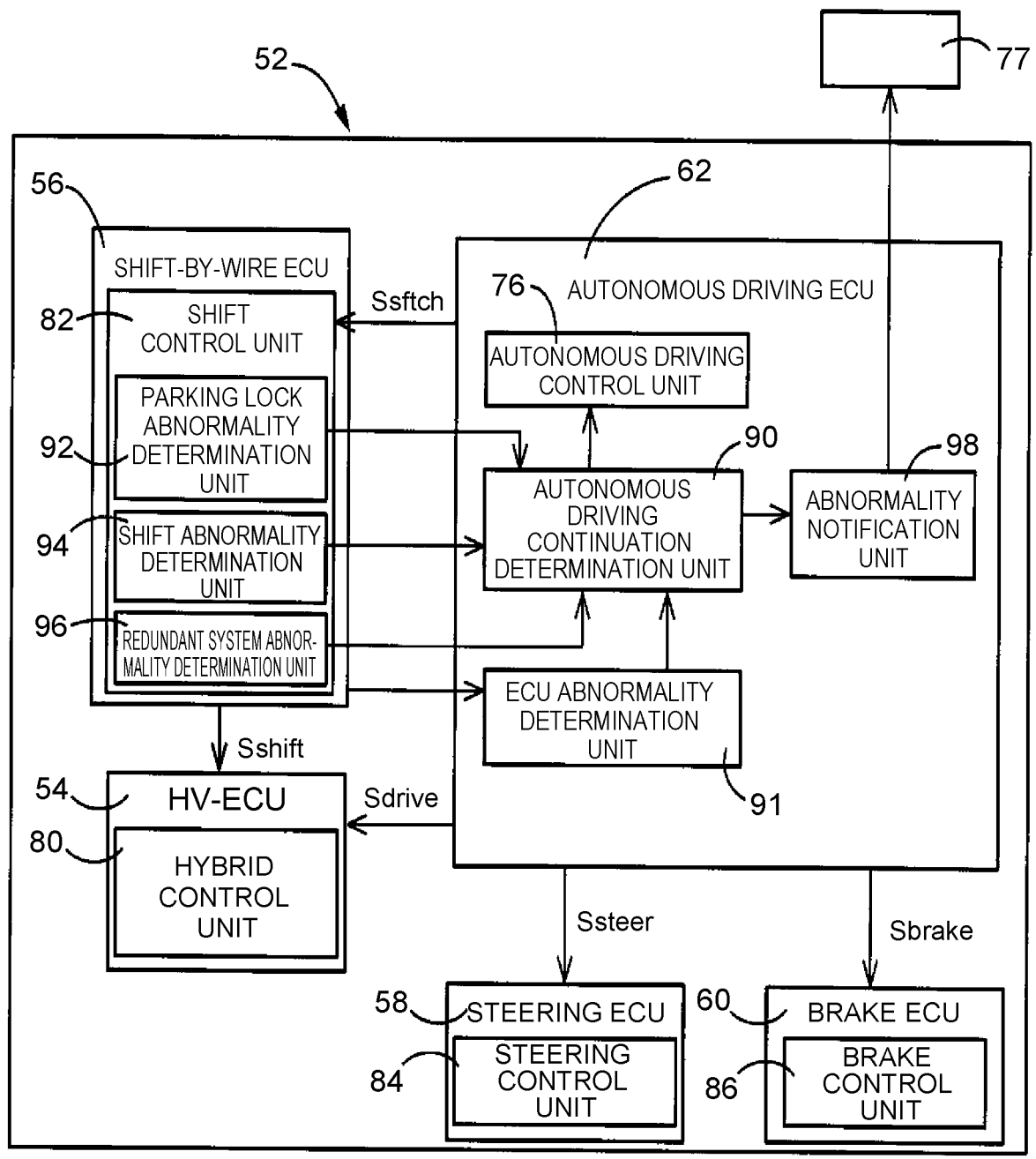
FIG. 2 is a functional block diagram illustrating the principal part of control functions of ECUs constituting an electronic control device of FIG. 1.

FIG. 2 is a functional block diagram illustrating the principal part of the control functions of the ECUs constituting the electronic control device 52 of FIG. 1.

The HV-ECU 54 functionally includes a hybrid control unit 80 configured to control output of the engine 12, the first electric motor MG1, and the second electric motor MG2 such that the request driving force based on the shift range of the transmission unit 14, the vehicle speed V, the operation amount of the accelerator pedal, or the like is output.

The shift-by-wire ECU 56 functionally includes a shift control unit 82 configured to switch the shift range of the transmission unit 14 based on the shift operation position Psh switched by the shift operation device 46. The shift control unit 82 also has a function of switching the shift range to the parking range by operating the electrically-operated actuator 28 so as to operate the parking lock mechanism 29, when the P switch 50 is pushed. The shift-by-wire ECU 56, the actuator 28 that drives the parking lock mechanism 29, the shift operation device 46, the CAN communication line 70, and the local line 72 constitute a shift control system 74 configured to switch the shift range of the transmission unit 14.

The steering ECU 58 functionally includes a steering control unit 84 that controls the electric motor 40 to generate the assist force corresponding to the operation amount of the steering wheel 30 operated by the driver and to the vehicle speed V.

The brake ECU 60 functionally includes a brake control unit 86 configured to increase the braking force by increasing the hydraulic pressure of the brake hydraulic cylinder 42 when, for example, urgent braking is performed, or to apply braking force to a prescribed wheel so as to restrain sideslip of the vehicle during turn-traveling.

The autonomous driving ECU 62 functionally includes an autonomous driving control unit 76 configured to control travel of the vehicle 10 when the travel mode is switched to the autonomous driving travel. The autonomous driving control unit 76 performs autonomous driving travel of the vehicle 10 to a target location, and performs autonomous parking of the vehicle 10 at a specified target parking location. When the travel mode is switched to the autonomous driving travel during travel, the autonomous driving control unit 76 performs autonomous driving travel of the vehicle 10 toward a preset target location. Specifically, the autonomous driving control unit 76 prepares an appropriate travel route to a target location based on the target location, the current location, or the like, with reference to prestored map information. According to the prepared travel route, the autonomous driving control unit 76 performs autonomous driving travel of the vehicle 10. When the target parking location is set, the autonomous driving control unit 76 executes autonomous parking (autonomous parking control) such that the vehicle 10 may park at the target parking location. Autonomous parking is one aspect of the autonomous driving travel. The autonomous driving control unit 76 corresponds to the control unit of the present disclosure.

The autonomous driving control unit 76 calculates, for appropriate travel of the vehicle 10, various request values (target values), such as a value of the shift range of the transmission unit 14, a value of request driving force of the vehicle 10, a value of steering angle θwheel of the steering wheel 30, and a value of the braking force of the wheel brakes 44, at any time during autonomous driving traveling, based on traffic information based on map information or the like, and various pieces of information regarding the surrounding of the vehicle 10 detected by the periphery recognition sensor 66, in consideration of information such as various pieces of information indicating the vehicle state detected by the vehicle state sensor 67. When the various request values are calculated, the autonomous driving control unit 76 outputs, to the shift control unit 82, the hybrid control unit 80, the steering control unit 84, and the brake control unit 86, commands for making the vehicle 10 travel with the calculated various request values as target values.

For example, when a shift request for switching the shift range of the transmission unit 14 is output during autonomous driving travel, the autonomous driving control unit 76 outputs a command for switching the shift range to the shift control unit 82. Upon reception of the command, the shift control unit 82 executes control for switching the shift range of the transmission unit 14.

When the request driving force of the vehicle 10 is calculated during the autonomous driving travel, the autonomous driving control unit 76 outputs a command for outputting the calculated request driving force to the hybrid control unit 80. Upon reception of the command, the hybrid control unit 80 controls the engine 12, the first electric motor MG1, and the second electric motor MG2 such that the calculated request driving force is output.

When the request value of the steering angle θwheel of the steering wheel 30 is calculated, the autonomous driving control unit 76 outputs to the steering control unit 84 a command for controlling the steering angle θwheel of the steering wheel 30 to be the calculated request value. Upon reception of the command, the steering control unit 84 drives the electric motor 40 so as to control the steering angle θwheel of the steering wheel 30 to be the request value.

When the request value of the braking force of the wheel brakes 44 is calculated, the autonomous driving control unit 76 outputs to the brake control unit 86 a command for controlling the braking force of the wheel brakes 44 to be the calculated request value. Upon reception of the command, the brake control unit 86 drives the brake hydraulic cylinder 42 so as to control the braking force of the wheel brakes 44 to be the request value. Thus, the autonomous driving control unit 76 executes autonomous driving travel of the vehicle 10 in cooperation with the hybrid control unit 80, the shift control unit 82, the steering control unit 84, and the brake control unit 86.

When executing autonomous parking for parking the vehicle 10 at a specified target parking location, the autonomous driving control unit 76 sets a travel route from the current position of the vehicle 10 to the target parking location based on the information regarding the surrounding of the vehicle 10 detected by the periphery recognition sensor 66, the travel route enabling the vehicle 10 to park at the target parking location without interfering with the surrounding obstacles or the like. The autonomous driving control unit 76 then controls the vehicle 10 to travel along the set travel route such that the vehicle 10 may autonomously park. During autonomous parking of the vehicle 10, as in the case of the autonomous driving travel, various request values including the shift range, the request driving force, the steering angle θwheel of the steering wheel 30, and the braking force of the wheel brakes 44 are calculated at any time, and the vehicle 10 is made to travel with the calculated various request values as target values.

Now, when an abnormality occurs in the system of controlling the travel of the vehicle in cooperation with the autonomous driving ECU during autonomous driving travel (hereinafter, autonomous driving travel may include autonomous parking unless otherwise specified), the autonomous driving ECU searches for a nearby refuge place, while controlling the vehicle to move to the searched refuge place, and then ends the autonomous driving travel. The refuge place is a predefined place where the vehicle can safely stop. Therefore, after the vehicle moves to the refuge place, it becomes difficult for the vehicle to travel to the target location by autonomous driving travel. Accordingly, for moving the vehicle to the target location, or for parking the vehicle at the target parking location, it becomes necessary for the driver to perform operation for travel of the vehicle. This reduces the scene where the autonomous driving travel is executed, resulting in deterioration in convenience of the autonomous driving travel. In the case where, for example, an abnormality occurs at the time of parking the vehicle at a narrow target parking location, and autonomous parking is thereby cancelled, it may be difficult for the driver, who is poor at driving, to park the vehicle, resulting in failure in parking at the target parking location.

Accordingly, in the present embodiment, when an abnormality that occurs during the autonomous driving travel is related to the shift control system 74 that switches the shift range of the transmission unit 14, it is possible to continue the autonomous driving travel and to reach the target location and the target parking location, depending on the type of the abnormality. For example, even in the case where switching to the parking range by operating the parking lock mechanism 29 becomes difficult, it is still possible to switch the shift range other than the parking range. Hence, it is possible to perform autonomous driving travel of the vehicle 10 to the target location and the target parking location. When forward-backward switching becomes difficult, autonomous driving travel may still be performed when forward-backward switching is not necessary before the vehicle reaches the target location and the target parking location. Accordingly, the autonomous driving ECU 62 includes a function of determining the propriety of travel by autonomous driving travel according to the type of the abnormality, when an abnormality occurs in the shift control system 74 that switches the shift range of the transmission unit 14.

The autonomous driving ECU 62 functionally includes, in addition to the autonomous driving control unit 76, an autonomous driving continuation determination unit 90 configured to determine, when an abnormality occurs in the shift control system 74, the propriety of travel by autonomous driving travel according to the type of the abnormality, an ECU abnormality determination unit 91 configured to determine an abnormality of the shift-by-wire ECU 56, and an abnormality notification unit 98 configured to notify occurrence of an abnormality. The shift-by-wire ECU 56 functionally includes a parking lock abnormality determination unit 92, a shift abnormality determination unit 94, and a redundant system abnormality determination unit 96 configured to determine the occurrence of various abnormalities regarding the shift control system 74 that switches the shift range of the transmission unit 14. The autonomous driving continuation determination unit 90 corresponds to the determination unit of the present disclosure.

When an abnormality occurs in the shift control system 74 during autonomous driving travel, the autonomous driving continuation determination unit 90 determines whether or not to continue the autonomous driving travel depending on whether or not the abnormality is an abnormality that does not prevent the vehicle from reaching the target location and the target parking location by the autonomous driving travel. The occurrence of the abnormality in the shift control system 74 is determined by the ECU abnormality determination unit 91, the parking lock abnormality determination unit 92, the shift abnormality determination unit 94, and the redundant system abnormality determination unit 96.

The ECU abnormality determination unit 91 determines whether or not an ECU abnormality that is failure in normal operation of the shift-by-wire ECU 56 occurs. When no signal is output from the shift-by-wire ECU 56 (ECU down), or when a self-check system, included in the shift-by-wire ECU 56 to determine whether or not the shift-by-wire ECU 56 operates normally, determines that the shift-by-wire ECU 56 does not operate normally, the ECU abnormality determination unit 91 determines that the ECU abnormality that is failure in normal operation of the shift-by-wire ECU 56 occurs. Since the ECU abnormality determination unit 91 determines whether or not the shift-by-wire ECU 56 operates normally, the ECU abnormality determination unit 91 is functionally included in the autonomous driving ECU 62.

The parking lock abnormality determination unit 92 (hereinafter, lock abnormality determination unit 92) determines whether or not an abnormality (hereinafter, referred to as parking lock abnormality) that is failure in switching to the parking range by operation of the parking lock mechanism 29 occurs. The lock abnormality determination unit 92 determines occurrence of parking lock abnormality, when detecting, for example, an abnormality in the actuator 28 that operates the parking lock mechanism 29, disconnection of the communication line connecting between the shift-by-wire ECU 56 and the actuator 28, and an abnormality that the shift-by-wire ECU 56 fails to output the command signal for controlling the actuator 28.

The shift abnormality determination unit 94 determines whether an abnormality in switching of the shift range, that is, abnormality in forward-backward switching (hereinafter, shift abnormality) in particular, occurs. The shift abnormality determination unit 94 determines that the shift abnormality occurs, when, for example, the shift signal Sshift for switching the forward-backward switching is not output from the shift-by-wire ECU 56, or when the shift switching command signal Ssftch for switching the forward-backward switching is not output from the autonomous driving ECU 62 to the shift-by-wire ECU 56.

The redundant system abnormality determination unit 96 determines whether an abnormality (hereinafter, referred to as redundant system abnormality) occurs in one of or both the two communication lines connecting between the HV-ECU 54 and the shift-by-wire ECU 56. As described before, the HV-ECU 54 and the shift-by-wire ECU 56 are connected through two communication lines, including the CAN communication line 70 and the local line 72. When detecting an abnormality, such as disconnection, at least in one of the communication lines, the redundant system abnormality determination unit 96 determines that the redundant system abnormality occurs. When the redundant system abnormality that is failure in one of the two communication lines occurs, the vehicle can travel to the target location and the target parking location based on a command signal output via the other communication line that is normal.

The autonomous driving continuation determination unit 90 determines whether or not to continue the autonomous driving travel, according to whether or not the abnormality determined by each of the ECU abnormality determination unit 91, the lock abnormality determination unit 92, the shift abnormality determination unit 94, and the redundant system abnormality determination unit 96 is the abnormality that does not prevent the vehicle from reaching the target location and the target parking location. The autonomous driving control unit 76 performs travel control of the vehicle 10 according to the propriety of travel by the autonomous driving travel, which is determined by the autonomous driving continuation determination unit 90. For example, when determining that continuation of the autonomous driving travel is possible, the autonomous driving control unit 76 continuously executes the autonomous driving travel.

When the ECU abnormality determination unit 91 determines the occurrence of ECU abnormality that is failure in normal operation of the shift-by-wire ECU 56 during autonomous driving travel, the autonomous driving continuation determination unit 90 determines that continuation of the autonomous driving travel to the target location and autonomous parking at the target parking location is impossible. When the ECU abnormality occurs, the operation of the shift-by-wire ECU 56 becomes unstable, and it becomes difficult to reach the target location and the target parking location by autonomous driving travel. In this case, the autonomous driving control unit 76 moves the vehicle 10 to a refuge place, and cancels the autonomous driving travel.

When the lock abnormality determination unit 92 determines the occurrence of parking lock abnormality during autonomous driving travel, i.e., when the abnormality that is failure in switching to the parking range occurs, the autonomous driving continuation determination unit 90 determines continuation of the autonomous driving travel to the target location is possible. When the lock abnormality determination unit 92 determines the occurrence of parking lock abnormality during autonomous parking, the autonomous driving continuation determination unit 90 determines that continuation of the autonomous parking at the target parking location is possible. When the parking lock abnormality occurs during autonomous driving travel, switching to the parking range is impossible after the vehicle 10 is stopped. However, the vehicle 10 can still reach the target location by autonomous driving travel, and can reach the target parking location by autonomous parking. Therefore, when the parking lock abnormality occurs during the autonomous driving travel and the autonomous parking, the autonomous driving continuation determination unit 90 determines that continuation of the autonomous driving travel and the autonomous parking is possible.

Since the autonomous driving continuation determination unit 90 determines that continuation of the autonomous driving travel and the autonomous parking is possible, the autonomous driving control unit 76 continuously executes the autonomous driving travel and the autonomous parking. Therefore, even in the case where the parking lock abnormality occurs, the autonomous driving travel and the autonomous parking are prevented from being cancelled more than necessary. Accordingly, the scene of executing the autonomous driving travel and the autonomous parking increases, and thereby the convenience of the autonomous driving travel and the autonomous parking is enhanced. Even in the case where, for example, the vehicle 10 is parked at a narrow target parking location, it is possible to park the vehicle 10 by autonomous parking.

When the shift abnormality determination unit 94 determines the occurrence of shift abnormality during autonomous driving travel, i.e., when an abnormality that is failure in forward-backward switching occurs during autonomous driving travel, and it is predicted that forward-backward switching (shift switching) is performed in subsequent travel (travel to the target location), the autonomous driving continuation determination unit 90 determines that continuation of the autonomous driving travel to the target location is impossible. In this case, the autonomous driving control unit 76 searches for a nearby refuge place which does not require forward-backward switching, and performs autonomous driving travel of the vehicle 10 to the searched refuge place. The autonomous driving control unit 76 then stops the vehicle 10, and cancels the autonomous driving travel. When the shift abnormality determination unit 94 determines the occurrence of shift abnormality during autonomous parking, and it is predicted that forward-backward switching is performed in subsequent travel, the autonomous driving continuation determination unit 90 determines that continuation of autonomous parking is impossible. In this case, the autonomous driving control unit 76 stops the vehicle 10, and cancels the autonomous parking.

On the contrary, when the shift abnormality determination unit 94 determines the occurrence of the shift abnormality during autonomous driving travel, i.e., when an abnormality that is failure in forward-backward switching occurs during autonomous driving travel, and it is predicted that forward-backward switching (shift switching) is not performed in subsequent travel (travel to the target location), the autonomous driving continuation determination unit 90 determines that continuation of the autonomous driving travel to the target location is possible. When the shift abnormality determination unit 94 determines the occurrence of shift abnormality during autonomous parking, i.e., when the shift abnormality occurs during the autonomous parking and it is predicted that forward-backward switching is not performed in subsequent parking, the autonomous driving continuation determination unit 90 determines that continuation of the autonomous parking at the target parking location is possible.

Even in the case where the shift abnormality occurs during autonomous driving travel and autonomous parking, the vehicle can still reach the target location by the autonomous driving travel, and the vehicle can park at the target parking location by the autonomous parking, unless forward-backward switching is performed after the occurrence of the shift abnormality. Accordingly, when the shift abnormality occurs during autonomous driving travel and autonomous parking, the autonomous driving continuation determination unit 90 determines that continuation of the autonomous driving travel and the autonomous parking is possible when it is predicted that forward-backward switching is not performed in the subsequent travel. Hence, the autonomous driving control unit 76 continuously executes autonomous driving travel and autonomous parking. Therefore, even in the case where the shift abnormality occurs, the autonomous driving travel and the autonomous parking is prevented from being cancelled more than necessary. Accordingly, the scene where the autonomous driving travel and the autonomous parking is executed increases, and thereby the convenience of the autonomous driving travel and the autonomous parking is enhanced.

Here, whether the forward-backward switching is performed in subsequent travel is predicted by prefetching the travel route set to reach the target location and the target parking location, and determining the forward-backward switching is performed when the forward-backward switching is considered to be necessary when the vehicle travels along the travel route. Accordingly, even in the case where the shift abnormality is detected during execution of autonomous driving travel, and it is determined that forward-backward switching is performed in subsequent travel, the autonomous driving continuation determination unit 90 may still determine that continuation of the autonomous driving travel is possible, when the autonomous driving control unit 76 searches for and detects a new travel route to the target location, the travel route not involving forward-backward switching. In this case, the autonomous driving control unit 76 performs autonomous driving travel of the vehicle 10 to the target location according to the detected new travel route. When the new travel route that does not involve the forward-backward switching is not detected, the autonomous driving continuation determination unit 90 determines that continuation of the autonomous driving travel is impossible. The autonomous driving control unit 76 performs autonomous driving travel of the vehicle 10 to a nearby refuge place. Once the vehicle 10 reaches the refuge place, the autonomous driving control unit 76 stops the vehicle 10, and cancels the autonomous driving travel.

This also applies to the case where shift abnormality is detected during execution of autonomous parking. Even when it is determined that forward-backward switching is performed in subsequent autonomous parking, the autonomous driving control unit 76 may search for a new travel route that does not involve the forward-backward switching. Once the new travel route is detected, the autonomous driving continuation determination unit 90 may determine that continuation of the autonomous parking is possible. In this case, the autonomous driving control unit 76 performs autonomous parking of the vehicle 10 at the target parking location according to the detected new travel route. When the new travel route that does not involve the forward-backward switching is not detected, the autonomous driving continuation determination unit 90 determines that continuation of the autonomous parking is impossible. Therefore, the autonomous driving control unit 76 stops the vehicle 10, and cancels the automatic parking control. For example, at the time of parking the vehicle 10 at the target parking location, there may be a case where the vehicle 10 can be parked without involving the forward-backward switching, if it is acceptable that the direction of the vehicle 10 be reversed after parking. In such a case, autonomous parking is continuously executed by a new travel route being reset.

There is a case where the autonomous driving travel and the autonomous parking are still continuously executed after parking lock abnormality or shift abnormality occurs during the autonomous driving travel and the autonomous parking. In this case, once the vehicle 10 stops at the target location and the target parking location, the autonomous driving continuation determination unit 90 determines that continuation of the autonomous driving travel and the autonomous parking is impossible. In this case, the autonomous driving control unit 76 cancels the autonomous driving travel and the autonomous parking, and the abnormality notification unit 98 displays occurrence of the abnormality on an instrument panel 77 included in the driver's seat to notify the driver that the abnormality occurs. The abnormality notification unit 98 also displays on the instrument panel 77 an action to take after the occurrence of the abnormality.

When the redundant system abnormality determination unit 96 determines the occurrence of redundant system abnormality because an abnormality occurs in one of the CAN communication line 70 and the local line 72 during autonomous driving travel, the autonomous driving continuation determination unit 90 determines that continuation of the autonomous driving travel to the target location is possible. When the redundant system abnormality determination unit 96 determines the occurrence of redundant system abnormality because an abnormality occurs in one of the CAN communication line 70 and the local line 72 during autonomous parking, the autonomous driving continuation determination unit 90 determines that continuation of the autonomous parking at the target parking location is possible. Even in the case where an abnormality occurs in one communication line out of the CAN communication line 70 and the local line 72, the shift control system 74 can be operated normally with the other communication line that is normal, and therefore the vehicle can travel to the target location and the target parking location. Accordingly, when redundant system abnormality occurs due to an abnormality in one communication line out of the CAN communication line 70 and the local line 72 during autonomous driving travel and autonomous parking, the autonomous driving continuation determination unit 90 determines that continuation of the autonomous driving travel and the autonomous parking is possible. In this case, the autonomous driving control unit 76 continuously executes the autonomous driving travel and the autonomous parking by using the normal communication line. Thus, even in the case where redundant system abnormality occurs, the autonomous driving travel and the autonomous parking are continuously executed when switching of the shift range by using the normal communication line is possible. This prevents cancellation of the autonomous driving travel and the autonomous parking more than necessary. Accordingly, the scene where the autonomous driving travel and the autonomous parking are executed increases, and thereby the convenience of the autonomous driving travel and the autonomous parking is enhanced.

On the contrary, when the redundant system abnormality determination unit 96 determines the occurrence of redundant system abnormality because an abnormality occurs in each of both the CAN communication line 70 and the local line 72 during autonomous driving travel, the autonomous driving continuation determination unit 90 determines that continuation of the autonomous driving travel to the target location and of the autonomous parking at the target parking location is impossible. In this case, the autonomous driving control unit 76 moves the vehicle 10 to a refuge place, and cancels the autonomous driving travel and the autonomous parking.

Thus, when the abnormality in the shift control system 74 that occurs during autonomous driving travel does not influence the travel of the vehicle 10, the autonomous driving continuation determination unit 90 determines that continuation of the autonomous driving travel is possible. When the abnormality influences the travel of the vehicle 10, the autonomous driving continuation determination unit 90 determines that continuation of the autonomous driving travel is impossible.

Figure 3:
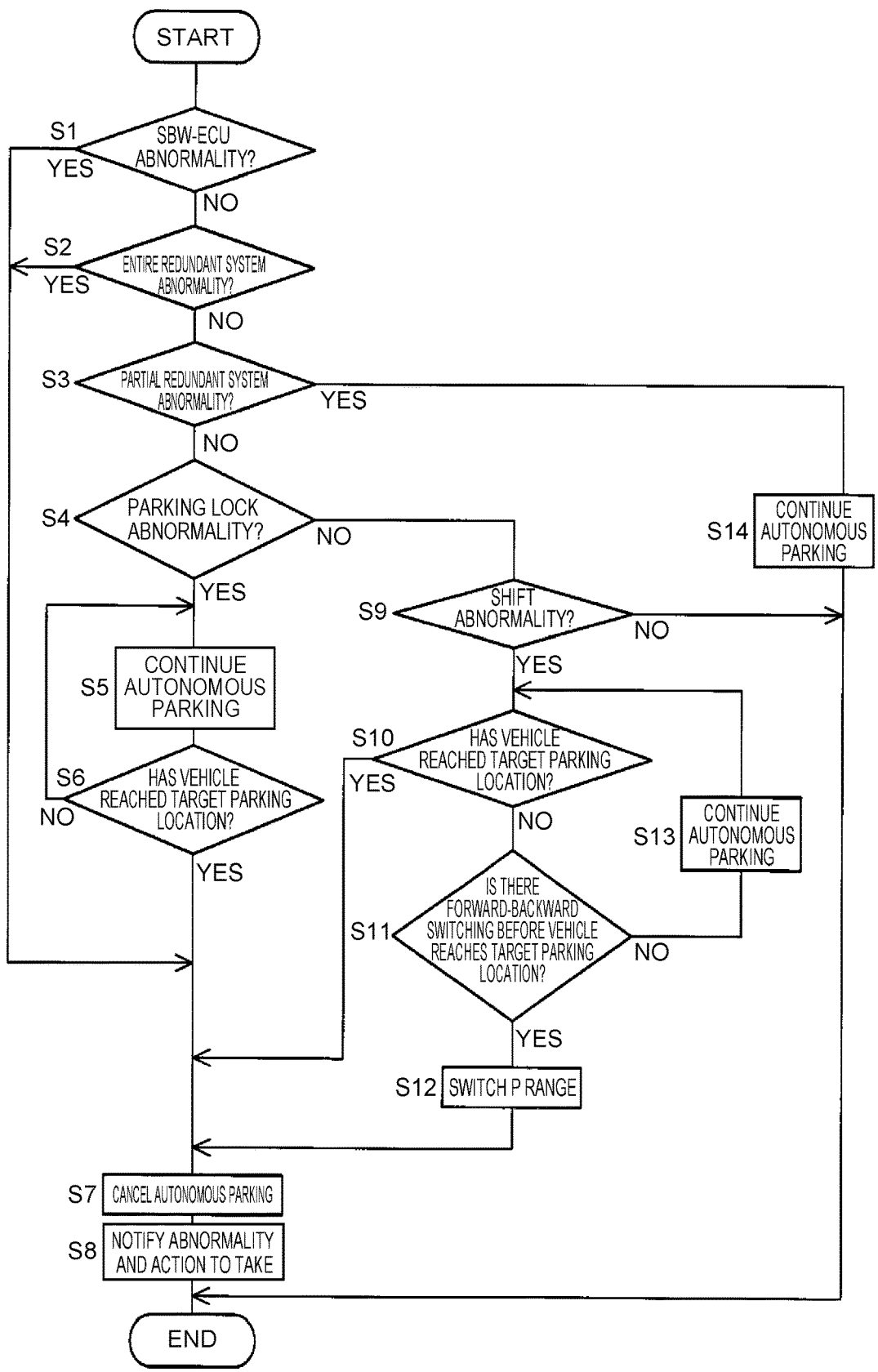
FIG. 3 is a flowchart illustrating control operation, among the control operation of the electronic control device of FIG. 2, for continuing autonomous parking to enhance convenience, even in the case where an abnormality occurs in a system that switches a shift range during autonomous parking.

FIG. 3 is a flowchart illustrating control operation, among the control operation of the electronic control device 52, that can enhance the convenience by increasing the scene of executing autonomous driving, even in the case where an abnormality occurs in the shift control system 74 that switches the shift range during automatic parking in particular. The flowchart is repeatedly executed during autonomous parking.

First, in step S1 (hereinafter, "step" is omitted) corresponding to the control function of the ECU abnormality determination unit 91, the ECU abnormality determination unit 91 determines whether an ECU abnormality that is failure in normal operation of the shift-by-wire ECU 56 occurs. When the ECU abnormality occurs, Yes is determined in S1. Accordingly, in S7 corresponding to the control function of the autonomous driving control unit 76 and the autonomous driving continuation determination unit 90, the autonomous driving continuation determination unit 90 determines that continuation of autonomous parking is impossible, and the autonomous driving control unit 76 cancels autonomous parking. When No is determined in S1, then in S2 corresponding to the control function of the redundant system abnormality determination unit 96, the redundant system abnormality determination unit 96 determines whether redundant system abnormality (entire redundant system abnormality) due to an abnormality in two communication lines including the CAN communication line 70 and the local line 72 occurs. When an abnormality occurs in each of both the CAN communication line 70 and the local line 72, Yes is determined in S2. In S7, the autonomous driving continuation determination unit 90 determines that continuation of autonomous parking is impossible, and the autonomous driving control unit 76 cancels autonomous parking. When No is determined in S2, then in S3 corresponding to the control function of the redundant system abnormality determination unit 96, the redundant system abnormality determination unit 96 determines whether redundant system abnormality (partial redundant system abnormality) occurs due to an abnormality in one communication line out of the CAN communication line 70 and the local line 72. When the abnormality occurs in one communication line out of the CAN communication line 70 and the local line 72, Yes is determined in S3. In S14 corresponding to the control function of the autonomous driving continuation determination unit 90 and the autonomous driving control unit 76, the autonomous driving continuation determination unit 90 determines that continuation of the autonomous parking by using the other normal communication line is possible, and the autonomous driving control unit 76 continuously executes autonomous parking.

When the redundant system abnormality is not detected, No is determined in S3. In S4 corresponding to the control function of the lock abnormality determination unit 92, the lock abnormality determination unit 92 determines whether parking lock abnormality occurs. When the parking lock abnormality is detected, Yes is determined in S4. In S5 corresponding to the control function of the autonomous driving continuation determination unit 90 and the autonomous driving control unit 76, the autonomous driving continuation determination unit 90 determines that continuation of autonomous parking is possible, and the autonomous driving control unit 76 continuously executes autonomous parking. In S6 corresponding to the control function of the autonomous driving control unit 76, the autonomous driving control unit 76 determines whether the vehicle 10 has reached a specified target parking location. When the vehicle 10 has not reached the target parking location, No is determined in S6. Then, the process returns to S5, where autonomous parking is continuously executed. When the vehicle 10 has reached the target parking location, Yes is determined in S6. Then in S7 corresponding to the control function of the autonomous driving continuation determination unit 90 and the autonomous driving control unit 76, the autonomous driving control unit 76 cancels autonomous parking. Next, in S8 corresponding to the control function of the abnormality notification unit 98, the abnormality notification unit 98 displays (notifies) on the instrument panel 77 the occurrence of the abnormality, and an action to take after the occurrence of the abnormality.

Again in S4, when the parking lock abnormality is not detected, No is determined in S4. In S9 corresponding to the control function of the shift abnormality determination unit 94, the shift abnormality determination unit 94 determines whether the shift abnormality occurs. When the shift abnormality is not detected, No is determined in S9, and the present routine is ended. When the shift abnormality is detected, Yes is determined in S9. In S10 corresponding to the control function of the autonomous driving control unit 76, the autonomous driving control unit 76 determines whether the vehicle has reached a specified target parking location. When the vehicle has reached the target parking location, Yes is determined in S10. In S7, the autonomous driving control unit 76 cancels autonomous parking. In S8, the abnormality notification unit 98 notifies the occurrence of abnormality to the driver.

When the vehicle has not reached the target parking location, No is determined in S10. In S11 corresponding to the control function of the autonomous driving continuation determination unit 90, the autonomous driving continuation determination unit 90 determines whether it is predicted that forward-backward switching is performed before the vehicle reaches the target parking location. When it is predicted that the forward-backward switching is not performed before the vehicle reaches the target parking location, No is determined in S11. In S13 corresponding to the control function of the autonomous driving continuation determination unit 90 and the autonomous driving control unit 76, the autonomous driving continuation determination unit 90 determines that continuation of autonomous parking is possible, and the autonomous driving control unit 76 continuously executes autonomous parking. When autonomous parking continues in S13, the process returns to S10. On the contrary, when it is predicted that the forward-backward switching is performed before the vehicle reaches the target parking location, Yes is determined in S11. In S12 corresponding to the control function of the autonomous driving continuation determination unit 90 and the autonomous driving control unit 76, the autonomous driving control unit 76 switches the shift range of the transmission unit 14 to the parking range, and stops the vehicle 10. Next, in S7, the autonomous driving control unit 76 cancels autonomous parking. In S8, the abnormality notification unit 98 notifies the occurrence of abnormality to the driver.

Figure 4:
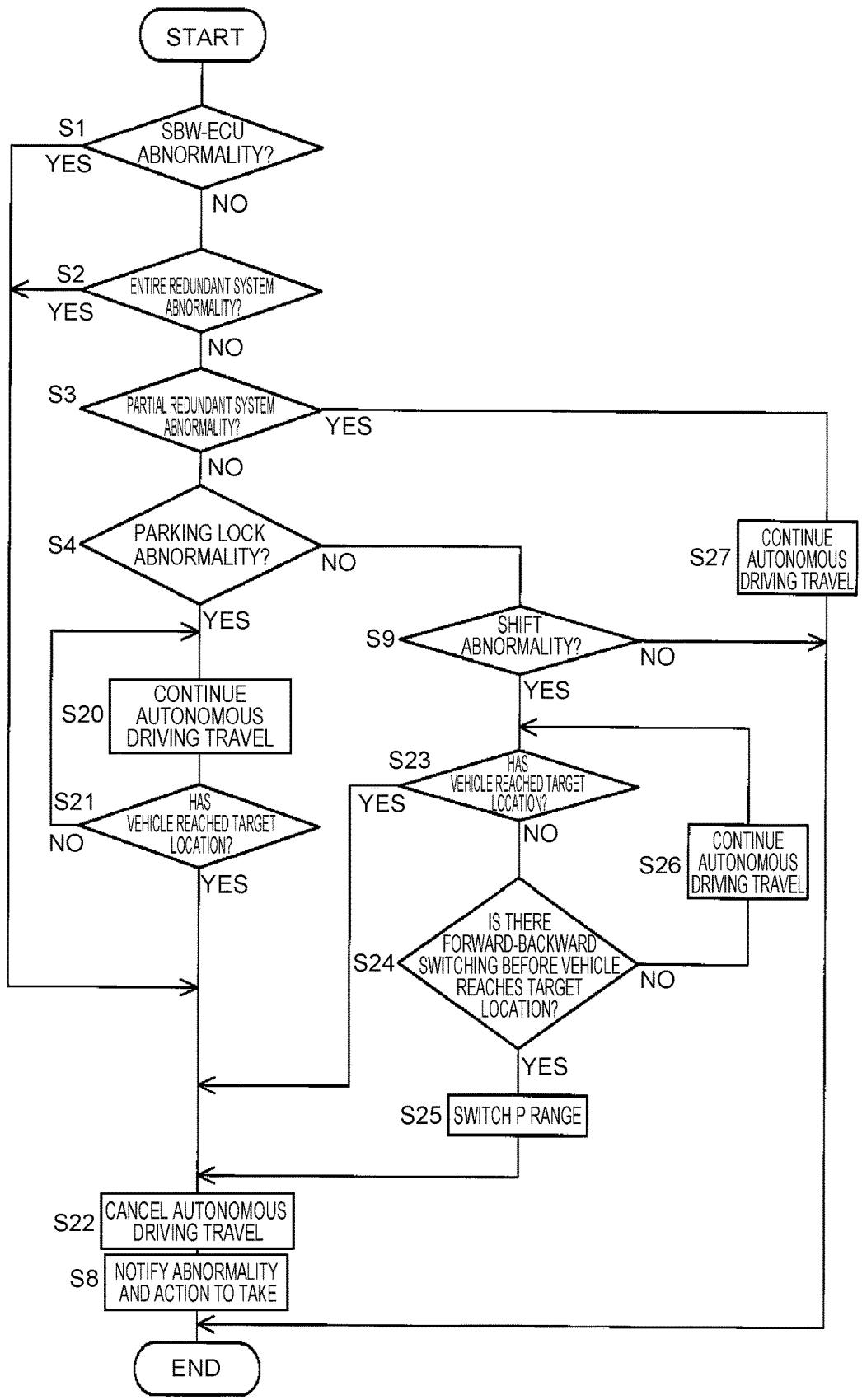
FIG. 4 is a flowchart illustrating control operation, among the control operation of the electronic control device of FIG. 2, for continuing autonomous driving travel to enhance convenience, even in the case where an abnormality occurs in the system that switches the shift range during autonomous driving travel.

FIG. 4 is a flowchart illustrating control operation, among the control operation of the electronic control device 52, that can enhance the convenience by increasing the scene of executing autonomous driving travel, even in the case where an abnormality occurs in the system that switches the shift range during the autonomous driving travel in particular. The flowchart is repeatedly executed during autonomous driving travel.

In FIG. 4, in step S1 (hereinafter, "step" is omitted) corresponding to the control function of the ECU abnormality determination unit 91, the ECU abnormality determination unit 91 determines whether an ECU abnormality that is failure in normal operation of the shift-by-wire ECU 56 occurs. When the ECU abnormality occurs, Yes is determined in S1. Accordingly, in S22 corresponding to the control function of the autonomous driving control unit 76 and the autonomous driving continuation determination unit 90, the autonomous driving continuation determination unit 90 determines that continuation of autonomous driving travel is impossible, and the autonomous driving control unit 76 cancels the autonomous driving travel. When No is determined in S1, then in S2 corresponding to the control function of the redundant system abnormality determination unit 96, the redundant system abnormality determination unit 96 determines whether redundant system abnormality occurs due to an abnormality in two communication lines including the CAN communication line 70 and the local line 72. When the abnormality occurs in each of both the CAN communication line 70 and the local line 72, Yes is determined in S2. In S22, the autonomous driving continuation determination unit 90 determines that continuation of autonomous driving travel is impossible, and the autonomous driving control unit 76 cancels the autonomous driving travel. When No is determined in S2, then in S3 corresponding to the control function of the redundant system abnormality determination unit 96, the redundant system abnormality determination unit 96 determines whether redundant system abnormality occurs due to an abnormality in one communication line out of the CAN communication line 70 and the local line 72. When the redundant system abnormality occurs due to the abnormality in one communication line, Yes is determined in S3. In S27 corresponding to the control function of the autonomous driving continuation determination unit 90 and the autonomous driving control unit 76, the autonomous driving continuation determination unit 90 determines that continuation of the autonomous driving travel by using the other normal communication line is possible, and the autonomous driving control unit 76 continuously executes the autonomous driving travel.

When the redundant system abnormality is not detected, No is determined in S3. In S4 corresponding to the control function of the lock abnormality determination unit 92, the lock abnormality determination unit 92 determines whether parking lock abnormality occurs. When the parking lock abnormality is detected, Yes is determined in S4. In S20 corresponding to the control function of the autonomous driving continuation determination unit 90 and the autonomous driving control unit 76, the autonomous driving continuation determination unit 90 determines continuation of the autonomous driving travel is possible, and the autonomous driving control unit 76 continuously executes the autonomous driving travel. In S21 corresponding to the control function of the autonomous driving control unit 76, the autonomous driving control unit 76 determines whether the vehicle 10 has reached a target location. When the vehicle 10 has not reached the target location, No is determined in S21. Then, the process returns to S20, where autonomous driving travel is continuously executed. When the vehicle 10 has reached the target location, Yes is determined in S21. In S22 corresponding to the control function of the autonomous driving continuation determination unit 90 and the autonomous driving control unit 76, the autonomous driving control unit 76 cancels the autonomous driving travel. Next, in S8 corresponding to the control function of the abnormality notification unit 98, the abnormality notification unit 98 displays (notifies) on the instrument panel 77 the occurrence of the abnormality, and an action to take after the occurrence of the abnormality.

Again in S4, when the parking lock abnormality is not detected, No is determined in S4. In S9 corresponding to the control function of the shift abnormality determination unit 94, the shift abnormality determination unit 94 determines whether the shift abnormality occurs. When the shift abnormality is not detected, No is determined in S9, and the present routine is ended. When the shift abnormality is detected, Yes is determined in S9. In S23 corresponding to the control function of the autonomous driving control unit 76, the autonomous driving control unit 76 determines whether the vehicle has reached the target location. When the vehicle has reached the target location, Yes is determined in S23. In S22, the autonomous driving control unit 76 cancels autonomous driving travel. In S8, the abnormality notification unit 98 notifies the occurrence of abnormality to the driver.

When the vehicle has not reached the target location, No is determined in S23. In S24 corresponding to the control function of the autonomous driving continuation determination unit 90, the autonomous driving continuation determination unit 90 determines whether it is predicted that forward-backward switching is performed before the vehicle reaches the target location. When it is predicted that the forward-backward switching is not performed before the vehicle reaches the target location, No is determined in S24. In S26 corresponding to the control function of the autonomous driving continuation determination unit 90 and the autonomous driving control unit 76, the autonomous driving continuation determination unit 90 determines that continuation of autonomous driving travel is possible, and the autonomous driving control unit 76 continuously executes the autonomous driving travel. On the contrary, when it is predicted that the forward-backward switching is performed before the vehicle reaches the target location, Yes is determined in S24. In S25 corresponding to the control function of the autonomous driving continuation determination unit 90 and the autonomous driving control unit 76, the autonomous driving control unit 76 switches the shift range of the transmission unit 14 to the parking range after moving the vehicle 10 to a prescribed refuge place, and then stops the vehicle 10. Next, in S22, the autonomous driving control unit 76 cancels autonomous driving travel. In S8, the abnormality notification unit 98 notifies the occurrence of abnormality to the driver.

As described in the foregoing, in the present embodiment, the vehicle 10 can be made to travel to a target location (including a target parking location) by autonomous driving travel (including autonomous parking), depending on the type of abnormality that occurs in the shift control system 74. Accordingly, the propriety of travel by autonomous driving travel is determined according to the type of abnormality in the shift control system 74. This makes it possible to restrain the autonomous driving travel from being cancelled more than necessary. Hence, the scene where autonomous driving travel is executed increases, and the convenience of autonomous driving travel is enhanced. Even in the case where an abnormality occurs in the shift control system 74, it is determined that continuation of autonomous driving travel is possible when the abnormality is the abnormality that does not prevent the vehicle from reaching the target location. Hence, the scene where autonomous driving travel is executed increases, and the convenience of autonomous driving travel is enhanced.

According to the present embodiment, even when switching to the parking range fails during autonomous driving travel (including autonomous parking), the vehicle can travel to the target location (including the target parking location) by autonomous driving travel. Therefore, even when an abnormality (parking lock abnormality) that is failure in switching to the parking range occurs during autonomous driving travel, it is determined that autonomous driving travel to the target location is possible. Accordingly, since the autonomous driving travel continues, the convenience of the autonomous driving travel is enhanced. Even in the case where an abnormality (shift abnormality) that is failure in forward-backward switching occurs during the autonomous driving travel, autonomous driving travel to the target location is possible when it is predicted that the forward-backward switching is not performed in subsequent travel. Therefore, even in the case where an abnormality that is failure in forward-backward switching occurs during the autonomous driving travel, it is determined that autonomous driving travel to the target location is possible when it is predicted that the forward-backward switching is not performed in subsequent travel. Accordingly, since the autonomous driving travel continues, the convenience of autonomous driving travel is enhanced. Moreover, the vehicle is configured to enable switching of the shift range through two communication lines including the CAN communication line 70 and the local line 72. Accordingly, even in the case where an abnormality occurs in one of the communication lines during autonomous driving travel, autonomous driving travel to the target location is possible by using the other communication that operates normally. Therefore, even when an abnormality (redundant system abnormality) occurs in one of the communications lines during autonomous driving travel, it is determined that autonomous driving travel to the target location is possible. Since the autonomous driving travel continues, the convenience of the autonomous driving travel is enhanced.

Next, description will be given of another embodiment of the present disclosure. In the following description, component members identical to those in the aforementioned embodiment are designated by identical reference signs to omit the description thereof.

Figure 5:
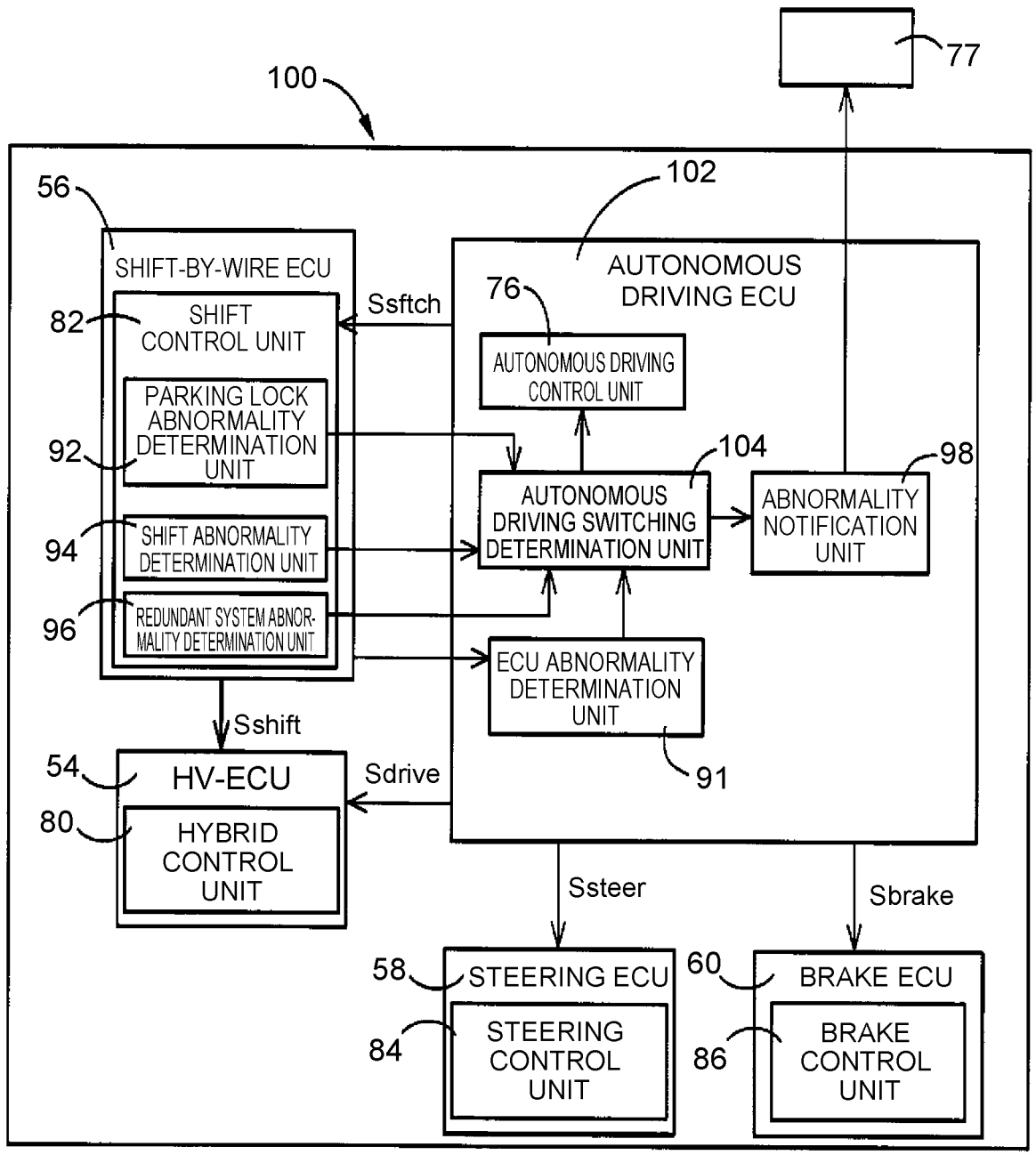
FIG. 5 is a functional block diagram illustrating the control function of an electronic control device that is another embodiment of the present disclosure.

FIG. 5 is a functional block diagram illustrating the control function of an electronic control device 100 (control device) as another embodiment of the present disclosure. FIG. 5 corresponds to FIG. 2 showing the embodiment described before. The electronic control device 100 of the present embodiment is configured by including an HV-ECU 54, a shift-by-wire ECU 56, a steering ECU 58, a brake ECU 60, and an autonomous driving ECU 102. Since the control functions included in the HV-ECU 54, the shift-by-wire ECU 56, the steering ECU 58, and the brake ECU 60 are substantially similar to those in the embodiment disclosed, the description thereof is omitted.

The autonomous driving ECU 102 functionally includes an autonomous driving control unit 76, an ECU abnormality determination unit 91, an abnormality notification unit 98, and an autonomous driving switching determination unit 104. Since the control functions of the autonomous driving control unit 76, the ECU abnormality determination unit 91, and the abnormality notification unit 98 are each substantially similar to those in the embodiment disclosed, the description thereof is omitted. The autonomous driving switching determination unit 104 corresponds to the control unit of the present disclosure.

When an abnormality occurs in the shift control system 74 that switches the shift range of the transmission unit 14 during manual driving travel, and then the driver executes operation for switching to autonomous driving travel and autonomous parking, the autonomous driving switching determination unit 104 determines whether or not switching to the autonomous driving travel and the autonomous parking is possible, according to the type of abnormality that occurs during manual driving travel. When the abnormality that occurs during manual driving travel is the abnormality that hinders the vehicle from reaching a target location (including a target parking location) in the case where the manual driving travel is switched to autonomous driving travel (including autonomous parking), the autonomous driving switching determination unit 104 determines that switching to the autonomous driving travel is impossible. When the abnormality that occurs during manual driving travel is the abnormality that does not prevent the vehicle from reaching the target location (including the target parking location) in the case where the manual driving travel is switched to autonomous driving travel (including autonomous parking), the autonomous driving switching determination unit 104 determines that switching to the autonomous driving travel is possible. The autonomous driving switching determination unit 104 determines whether or not switching to autonomous driving travel and autonomous parking from the manual driving travel is possible, based on whether or not the abnormality, determined by each of the ECU abnormality determination unit 91, the lock abnormality determination unit 92, the shift abnormality determination unit 94, and the redundant system abnormality determination unit 96, is the abnormality that does not prevent the vehicle from reaching the target location and the target parking location. The autonomous driving control unit 76 performs travel control of the vehicle 10 according to the propriety of switching to the autonomous driving travel and the autonomous parking, which is determined by the autonomous driving switching determination unit 104. For example, when it is determined that switching to the autonomous driving travel and the autonomous parking is possible, the autonomous driving control unit 76 switches the manual driving travel to the autonomous driving travel and autonomous parking, and performs travel control of the vehicle 10.

When the ECU abnormality determination unit 91 determines the occurrence of ECU abnormality during manual driving travel, and then the driver executes switching operation for switching to autonomous driving travel, the autonomous driving switching determination unit 104 determines that switching to the autonomous driving travel is impossible, and prohibits switching to the autonomous driving travel. When the ECU abnormality determination unit 91 determines occurrence of ECU abnormality during manual driving travel, and then the driver executes switching operation for switching to autonomous parking, the autonomous driving switching determination unit 104 determines that switching to the autonomous parking is impossible, and prohibits switching to the autonomous parking.

When the lock abnormality determination unit 92 detects parking lock abnormality, i.e., an abnormality that is failure in switching to the parking range occurs, during manual driving travel, and then the driver executes switching operation for switching to autonomous driving travel, the autonomous driving switching determination unit 104 determines that switching to the autonomous driving travel is possible, and permits switching to the autonomous driving travel. When the lock abnormality determination unit 92 detects parking lock abnormality during manual driving travel, and then the driver executes switching operation for switching to autonomous parking, the autonomous driving switching determination unit 104 determines that switching to the autonomous parking is possible, and permits switching to the autonomous parking. In the case where autonomous driving travel and autonomous parking are executed while the parking lock abnormality occurs, the vehicle 10 is unable to perform switching to the parking range when the vehicle 10 stops. The vehicle 10 is still able to reach the target location by autonomous driving travel and to park at the target parking location by autonomous parking. Accordingly, when the parking lock abnormality occurs during manual driving travel, and then the driver executes switching operation for switching to autonomous driving travel and autonomous parking, the autonomous driving switching determination unit 104 determines that switching to the autonomous driving travel and autonomous parking is possible. Therefore, even when parking lock abnormality occurs, switching to autonomous driving travel and autonomous parking is possible. This makes it possible to prevent switching to autonomous driving travel and autonomous parking from being prohibited more than necessary. This increases the scene where autonomous driving travel and autonomous parking are executed, and thereby the convenience of autonomous driving travel and autonomous parking is enhanced.

In the case where the shift abnormality determination unit 94 detects shift abnormality during manual driving travel, i.e., an abnormality that is failure in forward-backward switching occurs during manual driving travel, and then the driver executes switching operation for switching to the autonomous driving travel, the autonomous driving switching determination unit 104 determines that switching from the manual driving travel to the autonomous driving travel is possible, and permits switching to the autonomous driving travel, when it is predicted that forward-backward switching is not performed before the vehicle 10 reaches a target location in subsequent travel. When shift abnormality is detected during manual driving travel, i.e., a shift abnormality occurs, and then the driver executes switching operation for switching to autonomous parking, the autonomous driving switching determination unit 104 determines that switching from the manual driving travel to the autonomous parking is possible, and permits switching to the autonomous parking, when it is predicted that forward-backward switching is not performed before the vehicle 10 reaches the target parking location in subsequent travel.

Even in the case where the shift abnormality occurs during manual driving travel, the vehicle is still able to reach the target location by autonomous driving travel and to park at the target parking location by autonomous parking, when it is predicted that forward-backward switching is not performed before the vehicle reaches the target location and the target parking location in subsequent travel. Therefore, when switching operation for switching to autonomous driving travel and autonomous parking is executed, it is determined that switching to autonomous driving travel and autonomous parking is possible. Since switching to autonomous driving travel and autonomous parking is performed, the convenience of the autonomous driving travel and the autonomous parking is enhanced. Here, whether the forward-backward switching is performed before the vehicle reaches the target location and the target parking location is predicted by prefetching the travel route set to reach the target location and the target parking location, and determining that the forward-backward switching is considered to be necessary when the vehicle travels along the travel route.

In the case where the shift abnormality determination unit 94 detects the shift abnormality during manual driving travel, and then switching operation for switching to autonomous driving travel (including autonomous parking) is executed, the autonomous driving switching determination unit 104 determines that switching to the autonomous driving travel is impossible and prohibits switching to the autonomous driving travel, when it is predicted that forward-backward switching is performed before the vehicle 10 reaches the target location (including the target parking location) in subsequent travel. When a new travel route that does not require forward-backward switching is searched for and is detected as in the aforementioned embodiment, autonomous driving travel to the target location may be performed according to the new travel route. Thus, even in the case where the shift abnormality occurs, switching to autonomous driving travel may be permitted.

In the case where the redundant system abnormality determination unit 96 determines that a redundant system abnormality occurs in one of the CAN communication line 70 and the local line 72 during manual driving travel, and then the driver executes switching operation for switching to autonomous driving travel and autonomous parking, the autonomous driving switching determination unit 104 determines that switching from manual driving travel to the autonomous driving travel and the autonomous parking is possible, and permits switching to the autonomous driving travel and the autonomous parking. This is because, as described in the foregoing, when an abnormality occurs in one of the communication lines, the shift control system 74 can be operated normally, and the vehicle 10 can be made to travel to the target location and the target parking location by using the other communication line that is normal.

When the redundant system abnormality determination unit 96 determines that a redundant system abnormality occurs in the two communication lines including the CAN communication line 70 and the local line 72 during manual driving travel, and then the driver executes switching operation for switching to autonomous driving travel and autonomous parking, the autonomous driving switching determination unit 104 determines that switching from manual driving travel to the autonomous driving travel and the autonomous parking is impossible, and prohibits switching to the autonomous driving travel and the autonomous parking.

Figure 6:
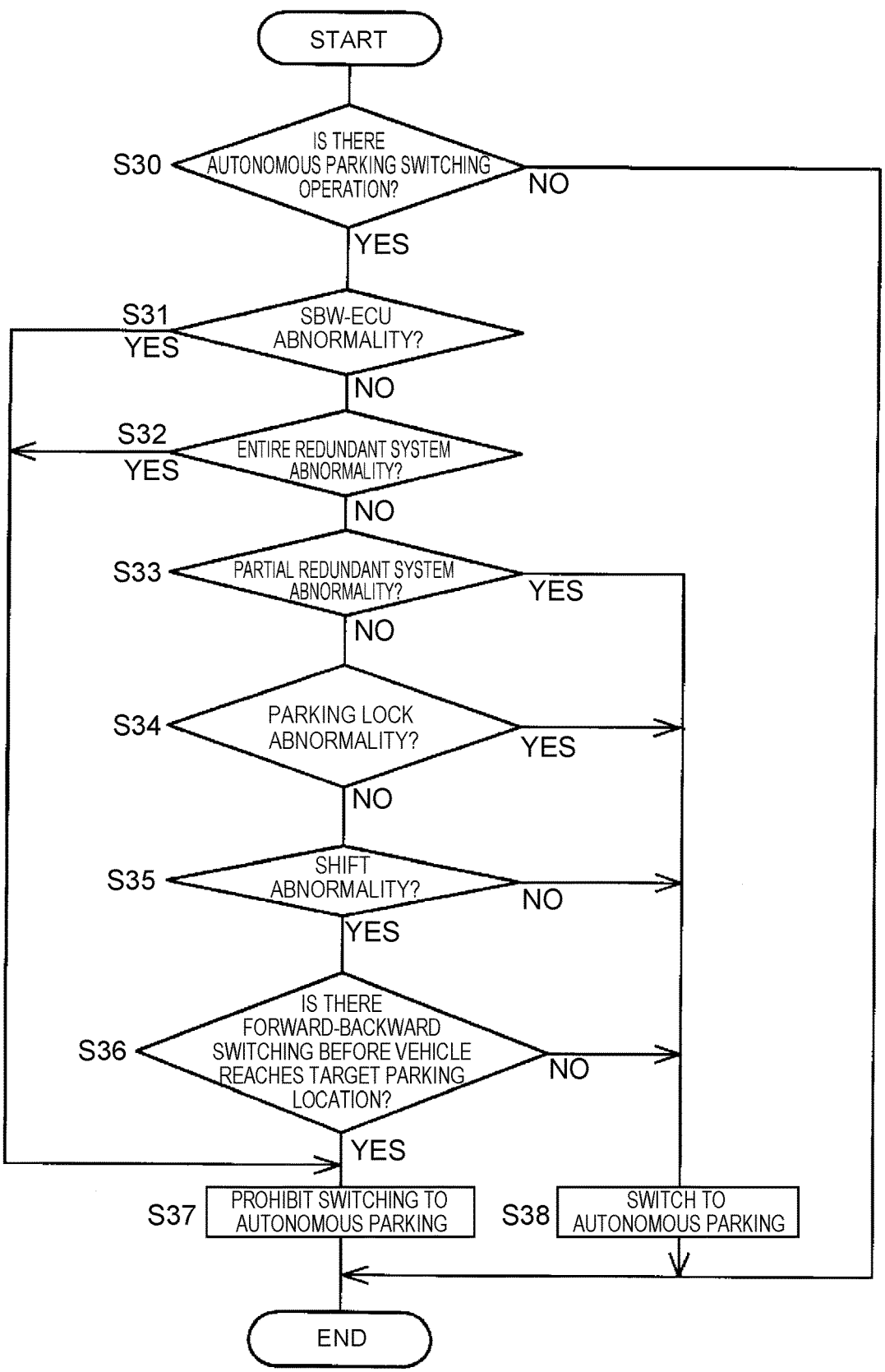
FIG. 6 is a flowchart illustrating control operation, among the control operation of the electronic control device of FIG. 5, in the case where an abnormality occurs in the system that switches the shift range during manual driving travel, and during parking of the vehicle in particular.

FIG. 6 is a flowchart illustrating control operation, among the control operation of the electronic control device 52, in the case where an abnormality occurs in the system relating to switching of the shift range during manual driving travel, and during parking of the vehicle 10 (parking transition stage) in particular. The flowchart is repeatedly executed during manual driving travel.

In S30 corresponding to the control function of the autonomous driving switching determination unit 104, the autonomous driving switching determination unit 104 determines whether the driver executes switching operation for switching to autonomous parking during manual driving travel. When the switching operation for switching to autonomous parking is not executed, No is determined in S30, and the present routine is ended. When the switching operation for switching to autonomous parking is executed, Yes is determined in S30. In S31 corresponding to the control function of the ECU abnormality determination unit 91, the ECU abnormality determination unit 91 determines whether an ECU abnormality that is failure in normal operation of the shift-by-wire ECU 56 occurs during manual driving travel. When the ECU abnormality occurs, Yes is determined in S31. Then in S37 corresponding to the control function of the autonomous driving switching determination unit 104, the autonomous driving switching determination unit 104 determines that switching to the autonomous parking is impossible, and prohibits switching to the autonomous parking.

When No is determined in S31, in S32 corresponding to the control function of the redundant system abnormality determination unit 96, the redundant system abnormality determination unit 96 determines whether redundant system abnormality (entire redundant system abnormality) occurs due to an abnormality in two communication lines including the CAN communication line 70 and the local line 72. When an abnormality occurs in each of both the CAN communication line 70 and the local line 72, Yes is determined in S32. In S37, the autonomous driving switching determination unit 104 determines that switching to autonomous parking is impossible, and prohibits switching to the autonomous parking.

When No is determined in S32, then in S33 corresponding to the control function of the redundant system abnormality determination unit 96, the redundant system abnormality determination unit 96 determines whether a redundant system abnormality occurs due to an abnormality in one communication line out of the CAN communication line 70 and the local line 72. When the abnormality (partial redundant system abnormality) occurs in one communication line out of the CAN communication line 70 and the local line 72, Yes is determined in S33. In S38 corresponding to the control function of the autonomous driving switching determination unit 104 and the autonomous driving control unit 76, the autonomous driving switching determination unit 104 determines that switching to autonomous parking is possible, and the autonomous driving control unit 76 performs switching to the autonomous parking.

When No is determined in S33, then in S34 corresponding to the control function of the lock abnormality determination unit 92, the lock abnormality determination unit 92 determines whether a parking lock abnormality occurs. When the parking lock abnormality is detected, Yes is determined in S34. In S38, the autonomous driving switching determination unit 104 determines that switching to autonomous parking is possible, and the autonomous driving control unit 76 performs switching to the autonomous parking. When the parking lock abnormality is not detected, No is determined in S34. In S35 corresponding to the control function of the shift abnormality determination unit 94, the shift abnormality determination unit 94 determines whether a shift abnormality occurs. When the shift abnormality is not detected, No is determined in S35. In S38, the autonomous driving switching determination unit 104 determines that switching to autonomous parking is possible, and the autonomous driving control unit 76 performs switching to the autonomous parking. When the shift abnormality is detected, Yes is determined in S35. In S36 corresponding to the control function of the autonomous driving switching determination unit 104, the autonomous driving switching determination unit 104 determines whether it is predicted that forward-backward switching is performed before the vehicle reaches the target parking location. When the autonomous driving switching determination unit 104 determines that forward-backward switching is not performed before the vehicle reaches the target parking location, No is determined in S36. Then in S38, the autonomous driving switching determination unit 104 determines that switching to autonomous parking is possible, and the autonomous driving control unit 76 performs switching to the autonomous parking. When the autonomous driving switching determination unit 104 determines that forward-backward switching is performed before the vehicle reaches the target parking location, Yes is determined in S36. Then in S37, the autonomous driving switching determination unit 104 determines that switching to autonomous parking is impossible, and prohibits switching to the autonomous parking.

Figure 7:
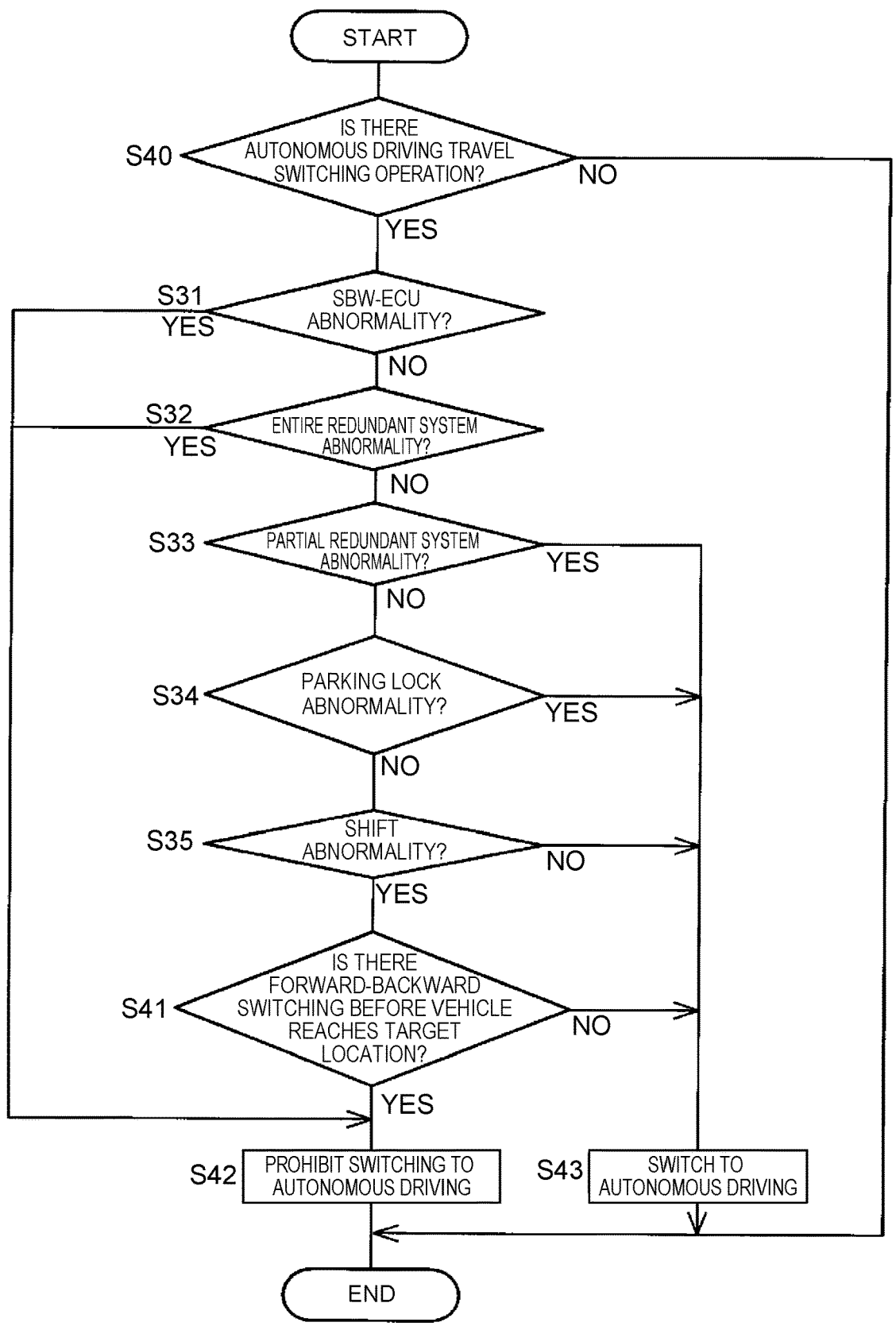
FIG. 7 is a flowchart illustrating control operation, among the control operation of the electronic control device of FIG. 5, in the case where an abnormality occurs in the system that switches the shift range during manual driving travel, and during execution of the autonomous driving travel in particular.

FIG. 7 is a flowchart illustrating control operation, among the control operation of the electronic control device 52, in the case where an abnormality occurs in the system relating to switching of the shift range during manual driving travel, and during execution of the autonomous driving travel in particular. The flowchart is repeatedly executed during manual driving travel.

In S40 corresponding to the control function of the autonomous driving switching determination unit 104, the autonomous driving switching determination unit 104 determines whether switching operation for switching to autonomous driving travel is executed during manual driving travel. When the switching operation for switching to autonomous driving travel is not executed, No is determined in S40, and the present routine is ended. When the switching operation for switching to autonomous driving travel is executed, Yes is determined in S40. Then in S31 corresponding to the control function of the ECU abnormality determination unit 91, the ECU abnormality determination unit 91 determines whether an ECU abnormality that is failure in normal operation of the shift-by-wire ECU 56 occurs during manual driving travel. When the ECU abnormality occurs, Yes is determined in S31. Then in S42 corresponding to the control function of the autonomous driving switching determination unit 104, the autonomous driving switching determination unit 104 determines that switching to the autonomous driving travel is impossible, and prohibits switching to the autonomous driving travel.

When No is determined in S31, then in S32 corresponding to the control function of the redundant system abnormality determination unit 96, the redundant system abnormality determination unit 96 determines whether a redundant system abnormality (entire redundant system abnormality) occurs due to an abnormality in two communication lines including the CAN communication line 70 and the local line 72. When abnormality occurs in both the CAN communication line 70 and the local line 72, Yes is determined in S32. Then in S42, the autonomous driving switching determination unit 104 determines that switching to the autonomous driving travel is impossible, and prohibits switching to the autonomous driving travel.

When No is determined in S32, then in S33 corresponding to the control function of the redundant system abnormality determination unit 96, the redundant system abnormality determination unit 96 determines whether redundant system abnormality occurs due to an abnormality in one communication line out of the CAN communication line 70 and the local line 72. When the abnormality (partial redundant system abnormality) occurs in one communication line out of the CAN communication line 70 and the local line 72, Yes is determined in S33. In S43 corresponding to the control function of the autonomous driving switching determination unit 104 and the autonomous driving control unit 76, the autonomous driving switching determination unit 104 determines that switching to autonomous driving travel is possible, and the autonomous driving control unit 76 performs switching to the autonomous driving travel.

When No is determined in S33, then in S34 corresponding to the control function of the lock abnormality determination unit 92, the lock abnormality determination unit 92 determines whether a parking lock abnormality occurs. When the parking lock abnormality is detected, Yes is determined in S34. Then in S43 corresponding to the control function of the autonomous driving switching determination unit 104 and the autonomous driving control unit 76, the autonomous driving switching determination unit 104 determines that switching to autonomous driving travel is possible, and the autonomous driving control unit 76 switches to autonomous driving travel. When the parking lock abnormality is not detected, No is determined in S34. In S35 corresponding to the control function of the shift abnormality determination unit 94, the shift abnormality determination unit 94 determines whether a shift abnormality occurs. When the shift abnormality is not detected, No is determined in S35. In S43, the autonomous driving switching determination unit 104 determines that switching to autonomous driving travel is possible, and the autonomous driving control unit 76 performs switching to the autonomous driving travel. When the shift abnormality is detected, Yes is determined in S35. In S41 corresponding to the control function of the autonomous driving switching determination unit 104, the autonomous driving switching determination unit 104 determines whether it is predicted that forward-backward switching is performed before the vehicle reaches the target location. When the autonomous driving switching determination unit 104 determines that forward-backward switching is not performed up to the target location, No is determined in S41. Then in S43, the autonomous driving switching determination unit 104 determines that switching to autonomous driving travel is possible, and the autonomous driving control unit 76 performs switching to the autonomous driving travel. When the autonomous driving switching determination unit 104 determines that forward-backward switching is performed up to the target location, Yes is determined in S41. Then in S42 corresponding to the control function of the autonomous driving switching determination unit 104, the autonomous driving switching determination unit 104 determines that switching to the autonomous driving travel is impossible, and prohibits switching to the autonomous driving travel.

As described in the foregoing, in the present embodiment, when an abnormality occurs in the shift control system 74 that switches the shift range during manual driving travel, and then the driver executes switching operation for switching to autonomous driving travel (including autonomous parking), it is determined that switching to the autonomous driving travel is impossible, and switching to the autonomous driving travel is prohibited, when the abnormality hinders the vehicle from reaching the target location. Contrary to this, when the abnormality is the abnormality that does not prevent the vehicle from reaching the target location by autonomous driving travel, it is determined that switching to the autonomous driving travel is possible, and the switching to the autonomous driving travel is performed. This restrains switching to the autonomous driving travel and autonomous parking from being prohibited more than necessary, resulting in increase of the scene where autonomous driving travel is executed. As a result, the convenience of autonomous driving travel is enhanced. Therefore, in the present embodiment, the same effect as the aforementioned embodiment is also obtained.

Although the embodiments of the present disclosure have been described in detail based on the drawings, the present disclosure is also applied to other aspects.

For example, the present disclosure may be implemented by combining each of the embodiments disclosed. More specifically, when an abnormality is detected during autonomous driving travel and autonomous parking, the autonomous driving continuation determination unit 90 may determine whether or not continuation of autonomous driving travel and autonomous parking is possible according to the type of the detected abnormality. When an abnormality is detected during manual driving travel, the autonomous driving switching determination unit 104 may determine whether or not switching to the autonomous driving travel and the autonomous parking is possible according to the type of the detected abnormality.

In the aforementioned embodiments, the vehicle 10 is configured to enable switching between manual driving travel and autonomous driving travel. However, the present disclosure is not limited to the vehicle 10 that enables switching between the manual driving travel and the autonomous driving travel. That is, the present disclosure is also applicable to a vehicle that can execute only the autonomous driving travel. When an abnormality occurs in the shift control system while the vehicle that can execute only the autonomous driving travel is traveling, the autonomous driving continuation determination unit 90 determines whether the vehicle can reach a target location by the autonomous driving travel according to the type of the abnormality that occurs. When the abnormality is the abnormality that does not prevent the vehicle from reaching the target location, autonomous driving travel is continued. This restrains autonomous driving travel from being canceled more than necessary, and restrains the vehicle from being stopped in a prescribed refuge place. As a result, the convenience of autonomous driving travel is enhanced.

The embodiments are configured such that the ECU abnormality determination unit 91, the parking lock abnormality determination unit 92, the shift abnormality determination unit 94, and the redundant system abnormality determination unit 96 determine the occurrence of abnormality. However, at least one of these units may detect an abnormality, and the propriety of travel by autonomous driving travel may be determined according to the type of the detected abnormality.

In the aforementioned embodiments, when an abnormality occurs during autonomous driving travel and autonomous parking, the autonomous driving continuation determination unit 90 determines whether or not continuation of the autonomous driving travel and the autonomous parking is possible according to the type of abnormality. However, when an abnormality occurs in any one of the autonomous driving travel and the autonomous parking, the autonomous driving continuation determination unit 90 may determine whether or not continuation of the autonomous driving travel or the autonomous parking is possible according to the type of the abnormality. When an abnormality occurs during manual driving travel, the autonomous driving switching determination unit 104 determines whether or not switching to autonomous driving travel and autonomous parking is possible according to the type of the abnormality. However, the autonomous driving switching determination unit 104 may determine whether or not switching to any one of the autonomous driving travel and the autonomous parking is possible.

In the autonomous driving travel of the aforementioned embodiments, the drive force, the shift range, the steering angle, and the braking force are all controlled autonomously. However, the autonomous driving travel of the present disclosure is not necessarily limited to this. It is sufficient for the autonomous driving travel that at least one of the drive force, the shift range, the steering angle, and the braking force is autonomously controlled for traveling, that is, it is sufficient that at least some of these parameters is controlled for traveling without depending on driver's operation. In other words, autonomous driving travel may be performed while some of the drive force, the shift range, the steering angle, and the braking force depends on driver's operation. For example, autonomous driving travel may be implemented such that the drive force and the braking force are autonomously controlled, and thereby the vehicle travels at a set vehicle speed or follows a leading vehicle while maintaining a prescribed inter-vehicle distance.

In the aforementioned embodiments, in the case where a shift abnormality occurs during autonomous driving travel, and forward-backward switching is performed up to the target location, autonomous driving travel is canceled. However, when the current location of the vehicle is distanced from the location where forward-backward switching is performed, continuation of the autonomous driving travel may be permitted up to the vicinity of the location where the forward-backward switching is performed. In the aforementioned embodiments, in the case where a shift abnormality occurs during manual driving travel, and then switching operation for switching to autonomous driving travel is executed, switching to autonomous driving travel is prohibited when the forward-backward switching is performed up to the target location. However, when the current location of the vehicle is distanced from the location where forward-backward switching is performed, switching to autonomous driving travel may be permitted to allow the vehicle to perform autonomous driving travel up to the vicinity of the location where the forward-backward switching is performed. That is, in a case where an abnormality occurs in the shift control system, the vicinity of the location where the forward-backward switching is performed when the forward-backward switching is performed up to the target location corresponds to one of the target location in the present disclosure.

In the aforementioned embodiments, the shift-by-wire ECU 56 and the HV-ECU 54 are connected through two communication lines including the CAN communication line 70 and the local line 72. However, the number of the communication lines is not limited to two. The shift-by-wire ECU 56 and the HV-ECU 54 may be connected through three or more communication lines, and the shift range may be switched with use of each of the communication lines.

In the aforementioned embodiments, the order of steps, or the like, in the flowcharts shown in FIGS. 3, 4, 6, and 7 may properly be changed without producing inconsistency.

The embodiments disclosed are merely examples, and the present disclosure may be carried out in aspects to which various arrangements and modifications are applied based on the knowledge of those skilled in the art.

What is claimed is:

1. A vehicle control device applied to a vehicle, the vehicle control device comprising:
    shift control circuitry configured to switch a shift range; and
    processing circuitry configured to:
        control the vehicle to perform autonomous driving travel to a target location without depending on an operation of a driver in at least one driving operation;
        determine propriety of travel by the autonomous driving travel according to a type of abnormality that occurs in the shift control circuitry and whether the abnormality that occurs in the shift control circuitry is an abnormality that does not prevent the vehicle from reaching the target location; and
        perform travel control of the vehicle according to the propriety of travel by the autonomous driving travel.

2. The vehicle control device according to claim 1, wherein:
    the vehicle control device is applied to a vehicle configured to enable switching between the autonomous driving travel and manual driving travel where the vehicle is controlled to travel by the operation of the driver; and
    the processing circuitry is further configured to, when the abnormality in the shift control circuitry is the abnormality that does not prevent the vehicle from reaching the target location, determine that the autonomous driving travel is possible, or determine that switching from the manual driving travel to the autonomous driving travel is possible.

3. The vehicle control device according to claim 2, wherein the processing circuitry is further configured to, when the abnormality is an abnormality that is failure in switching to a parking range occurs during the manual driving travel, and then the driver executes switching operation to the autonomous driving travel, determine that switching to the autonomous driving travel is possible.

4. The vehicle control device according to claim 2, wherein:
    the processing circuitry is further configured to predict whether forward-backward switching is performed in subsequent travel; and
    the processing circuitry is further configured to, in a case where the abnormality is an abnormality that is failure in the forward-backward switching occurs during the manual driving travel, and then the driver executes a switching operation to the autonomous driving travel, determine that switching to the autonomous driving travel is possible when the controller predicts that the forward-backward switching is not performed in subsequent travel.

5. The vehicle control device according to claim 1, wherein the processing circuitry is further configured to, when the abnormality is an abnormality that is failure in switching to a parking range occurs during the autonomous driving travel, determine that the autonomous driving travel of the vehicle to the target location is possible.

6. The vehicle control device according to claim 1, wherein:
    the processing circuitry is further configured to predict whether forward-backward switching is performed in subsequent travel; and
    the processing circuitry is further configured to, when the abnormality is an abnormality that is failure in the forward-backward switching occurs during the autonomous driving travel, and the controller predicts that the forward-backward switching is not performed in subsequent travel, determine that the autonomous driving travel of the vehicle to the target location is possible.

7. The vehicle control device according to claim 1, wherein:
    the shift control circuitry is configured to switch the shift range through two or more communication paths; and
    the processing circuitry is further configured to, when the abnormality is an abnormality that occurs in one of the communication paths, determine that the autonomous driving travel of the vehicle to the target location is possible.

* * * * *